(12) United States Patent
Shimizu et al.

(10) Patent No.: US 8,369,689 B2
(45) Date of Patent: Feb. 5, 2013

(54) INFORMATION RECORDING/REPRODUCTION DEVICE AND INFORMATION RECORDING MEDIUM

(75) Inventors: Yukitaka Shimizu, Narashino (JP);
Yoshihiro Okada, Chiba (JP);
Kenichiro Tada, Tokorozawa (JP);
Kyoichi Terao, Tokorozawa (JP);
Yasuaki Yamada, Yokohama (JP); Junji Shiokawa, Yokohama (JP); Yuichi Kanai, Moriguchi (JP)

(73) Assignees: Sharp Kabushiki Kaisha, Osaka (JP);
Pioneer Corporation, Tokyo (JP); JVC Kenwood Corporation, Kanagawa (JP);
Hitachi, Ltd, Tokyo (JP); Sanyo Electric Co., Ltd., Osaka (JP)

( * ) Notice: Subject to any disclaimer, the term of this patent is extended or adjusted under 35 U.S.C. 154(b) by 1238 days.

(21) Appl. No.: 11/795,293

(22) PCT Filed: Jan. 12, 2006

(86) PCT No.: PCT/JP2006/300249
§ 371 (c)(1),
(2), (4) Date: Jul. 16, 2007

(87) PCT Pub. No.: WO2006/080194
PCT Pub. Date: Aug. 3, 2006

(65) Prior Publication Data
US 2008/0152317 A1    Jun. 26, 2008

(30) Foreign Application Priority Data

Jan. 26, 2005 (JP) ................................. 2005-018938

(51) Int. Cl.
*H04N 9/80* (2006.01)

(52) U.S. Cl. ....................... 386/262; 386/239

(58) Field of Classification Search .................... 386/68, 386/239, 262
See application file for complete search history.

(56) References Cited

U.S. PATENT DOCUMENTS 5,504,585 A    4/1996 Fujinami et al.
6,883,099 B2*  4/2005 Terrell et al. ................... 726/15
(Continued)

FOREIGN PATENT DOCUMENTS

EP    1 280 347 A1    1/2003
JP    6-267196 A       9/1994
(Continued)

OTHER PUBLICATIONS

Supplementary European Search Report for corresponding European Patent Application No. 06702666.6, dated Dec. 28, 2010.

*Primary Examiner* — Jamie Atala
(74) *Attorney, Agent, or Firm* — Birch, Stewart, Kolasch & Birch, LLP

(57) ABSTRACT

There is provided an information recording medium that reduces operation of shifting information backward or putting information forward closer together upon recording/deleting/dividing information to facilitate processes of recording/deleting/dividing information. An information recording medium records Programs 1 composed of image data, etc., UPGR 3 that refers to at least a part of the Programs 1, PGRG 5 that refers to the UPGR 3, a PGRM that collectively records the UPGR 3 and reference information thereof, and a PGRGM that collectively records the PGRG 5 and reference information thereof. When recording the UPGR 3, the information recording medium refers to the reference information contained in the PGRM, and when invalid reference information or reference information giving no reference to any UPGR 3 is present, records the UPGR 3 using the reference information. When recording the PGRG 5, the information recording medium refers to the reference information contained in the PGRGM, and when invalid reference information or reference information giving no reference to any PGRG 5 is present, records the PGRG 5 using the reference information.

9 Claims, 27 Drawing Sheets

U.S. PATENT DOCUMENTS

| | | |
|---|---|---|
| 2002/0054757 A1 | 5/2002 | Moon et al. |
| 2003/0229642 A1 | 12/2003 | Kim et al. |
| 2004/0067042 A1 | 4/2004 | Hughes, Jr. |
| 2004/0165861 A1* | 8/2004 | Seo et al. .................. 386/68 |
| 2004/0213552 A1 | 10/2004 | Kato |
| 2004/0255250 A1* | 12/2004 | Tsukamoto ................ 715/723 |
| 2005/0141863 A1 | 6/2005 | De Haan |

FOREIGN PATENT DOCUMENTS

| | | |
|---|---|---|
| JP | 2000-67524 A | 3/2000 |
| JP | 2001-76462 A | 3/2001 |
| JP | 2002-84498 A | 3/2002 |
| JP | 2002-157863 A | 5/2002 |
| JP | 2003-6979 A | 1/2003 |
| JP | 2003-259268 A | 9/2003 |
| JP | 2004-127395 A | 4/2004 |
| JP | 2004-134075 A | 4/2004 |
| JP | 2004-259392 A | 9/2004 |
| JP | 2004-362655 A | 12/2004 |
| JP | 2005-12256 A | 1/2005 |
| KR | 10-0389855 B1 | 8/2003 |
| WO | WO-03/079358 A1 | 9/2003 |
| WO | WO 2004/047100 A1 | 6/2004 |

\* cited by examiner

| FILE NAME | MAIN INFORMATION TO BE RECORDED |
|---|---|
| TVREC. MGR | LIST OF PGMAP, OF UDFFT, AND OF UDFF |
| PGRG. MGR | INFORMATION FOR MAKING REFERENCE TO PGRG |
| PGRG_INF. TBL | LIST OF PGRG |
| PGR. MGR | INFORMATION FOR MAKING REFERENCE TO PGR |
| PGR_INF. TBL | LIST OF PGR |
| PROGxxxx. PIF | INFORMATION FOR MAKING REFERENCE TO Program |

(B)

| FILE NAME | MAIN INFORMATION TO BE RECORDED |
|---|---|
| *PlaybackInfo | INFORMATION ON ENCRYPTION OF IMAGE DATA |
| *MainTS | IMAGE DATA |

FIG.8
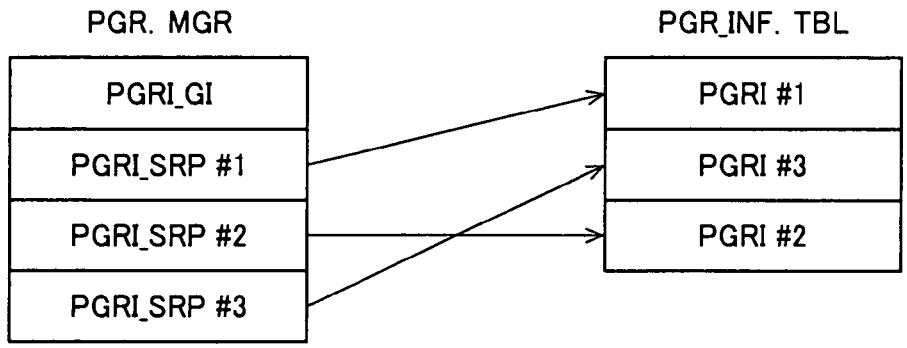
FIG.9
| REFERENCE POINTER(PGR. MGR) | PGR(PGR_INF. TBL) |
|---|---|
| PGRI_SRP #1 (VALID) | PGRI #1 |
| PGRI_SRP #2 (VALID) | PGRI #2 |
| PGRI_SRP #3 (VALID) | PGRI #3 |
FIG.10
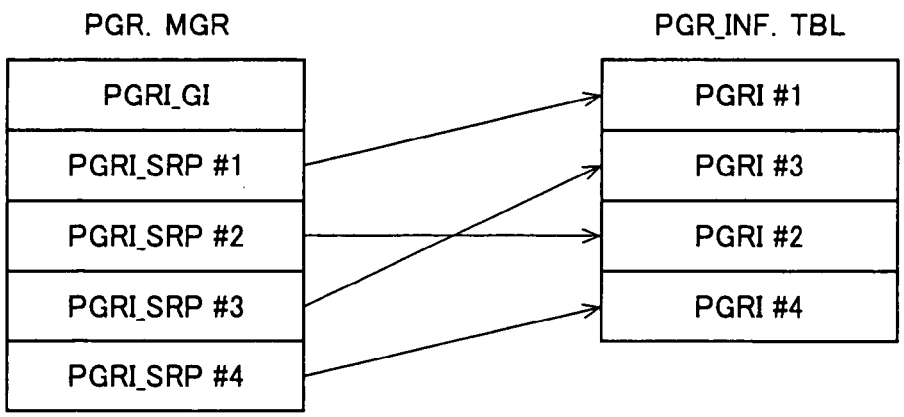

| REFERENCE POINTER(PGR. MGR) | PGR(PGR_INF. TBL) |
|---|---|
| PGRI_SRP #1(VALID) | PGRI #1 |
| PGRI_SRP #2(VALID) | PGRI #2 |
| PGRI_SRP #3(VALID) | PGRI #3 |
| PGRI_SRP #4(VALID) | PGRI #4 |

| REFERENCE POINTER(PGR. MGR) | PGR(PGR_INF. TBL) |
|---|---|
| PGRI_SRP #1 (INVALID) | PGRI #1 |
| PGRI_SRP #2 (VALID) | PGRI #2 |
| PGRI_SRP #3 (VALID) | PGRI #3 |
| PGRI_SRP #4 (VALID) | PGRI #4 |

| REFERENCE POINTER(PGR. MGR) | PGR(PGR_INF. TBL) |
|---|---|
| PGRI_SRP #1 (INVALID) | PGRI #1 |
| PGRI_SRP #2 (VALID) | PGRI #2 |
| PGRI_SRP #3 (VALID) | PGRI #3 |
| PGRI_SRP #4 (VALID) | PGRI #4 |

| REFERENCE POINTER(PGR. MGR) | PGR(PGR_INF. TBL) |
|---|---|
| PGRI_SRP #1(NOT REFERRING TO ANY PGRI) | NONE |
| PGRI_SRP #2(VALID) | PGRI #2 |
| PGRI_SRP #3(VALID) | PGRI #3 |
| PGRI_SRP #4(VALID) | PGRI #4 |

| BP | LENGTH IN BYTES | FIELD NAME | CONTENTS |
|---|---|---|---|
| 0 | 2 | TV Recording Application Version | TVRA_VER |
| 2 | 12 | TV Recording Application Resume Mark | TVRA_RM |

| BP | LENGTH IN BYTES | FIELD NAME | CONTENTS |
|---|---|---|---|
| 0 | 1 | Reserved | bslbf |
| 1 | 1 | Number of User Defined Favorite Folders | uimsbf |

FIG.32

| BP | LENGTH IN BYTES | FIELD NAME | CONTENTS |
|---|---|---|---|
| 0 | 2 | Length of User Defined Favorite Folder Information | uimsbf |
| 2 | 104 | User Defined Favorite Folder Name | DString[96] |
| 106 | N | User Defined Favorite Folder Thumbnail | TN |
| 106+N | 2 | Number of Pointers | uimsbf |

FIG.33

| BP | LENGTH IN BYTES | FIELD NAME | CONTENTS |
|---|---|---|---|
| 0 | 1 | Character Set | uimsbf |
| 1 | 3 | Reserved | bslbf |
| 4 | 2 | Character strings field size | uimsbf |
| 6 | 2 | Length of character string | uimsbf |
| 8 | n | Character Strings | bslbf |

FIG.34

| BIT15 | BIT14 | BIT13 | BIT12 | BIT11 | BIT10 | BIT9 | BIT8 |
|---|---|---|---|---|---|---|---|
| ET | ID[14..8] | | | | | | |

| BIT7 | BIT6 | BIT5 | BIT4 | BIT3 | BIT2 | BIT1 | BIT0 |
|---|---|---|---|---|---|---|---|
| ID[7..0] | | | | | | | |

| BP | LENGTH IN BYTES | FIELD NAME | CONTENTS |
|---|---|---|---|
| 0 | 2 | Reserved | bslbf |
| 2 | 2 | Number of Program Reference Groups | uimsbf |

| BP | LENGTH IN BYTES | FIELD NAME | CONTENTS |
|---|---|---|---|
| 0 | 2 | Length of Program Reference Group Information | uimsbf |
| 2 | 104 | Program Reference Group Name | DString[96] |
| 106 | N | Program Reference Group Thumbnail | TN |
| 106+N | 2 | Number of Program Reference Pointers | uimsbf |

| BP | LENGTH IN BYTES | FIELD NAME | CONTENTS |
|---|---|---|---|
| 0 | 2 | Program Reference ID | uimsbf |

FIG.42

| BP | LENGTH IN BYTES | FIELD NAME | CONTENTS |
|---|---|---|---|
| 0 | 2 | Reserved | bslbf |
| 2 | 2 | Number of Program References | uimsbf |

FIG.43

| BIT31 | BIT30 | BIT29 | BIT28 | BIT27 | BIT26 | BIT25 | BIT24 |
|---|---|---|---|---|---|---|---|
| IV | SA[30..24] | | | | | | |

| BIT23 | BIT22 | BIT21 | BIT20 | BIT19 | BIT18 | BIT17 | BIT16 |
|---|---|---|---|---|---|---|---|
| SA[23..16] | | | | | | | |

| BIT15 | BIT14 | BIT13 | BIT12 | BIT11 | BIT10 | BIT9 | BIT8 |
|---|---|---|---|---|---|---|---|
| SA[15..8] | | | | | | | |

| BIT7 | BIT6 | BIT5 | BIT4 | BIT3 | BIT2 | BIT1 | BIT0 |
|---|---|---|---|---|---|---|---|
| SA[7..0] | | | | | | | |

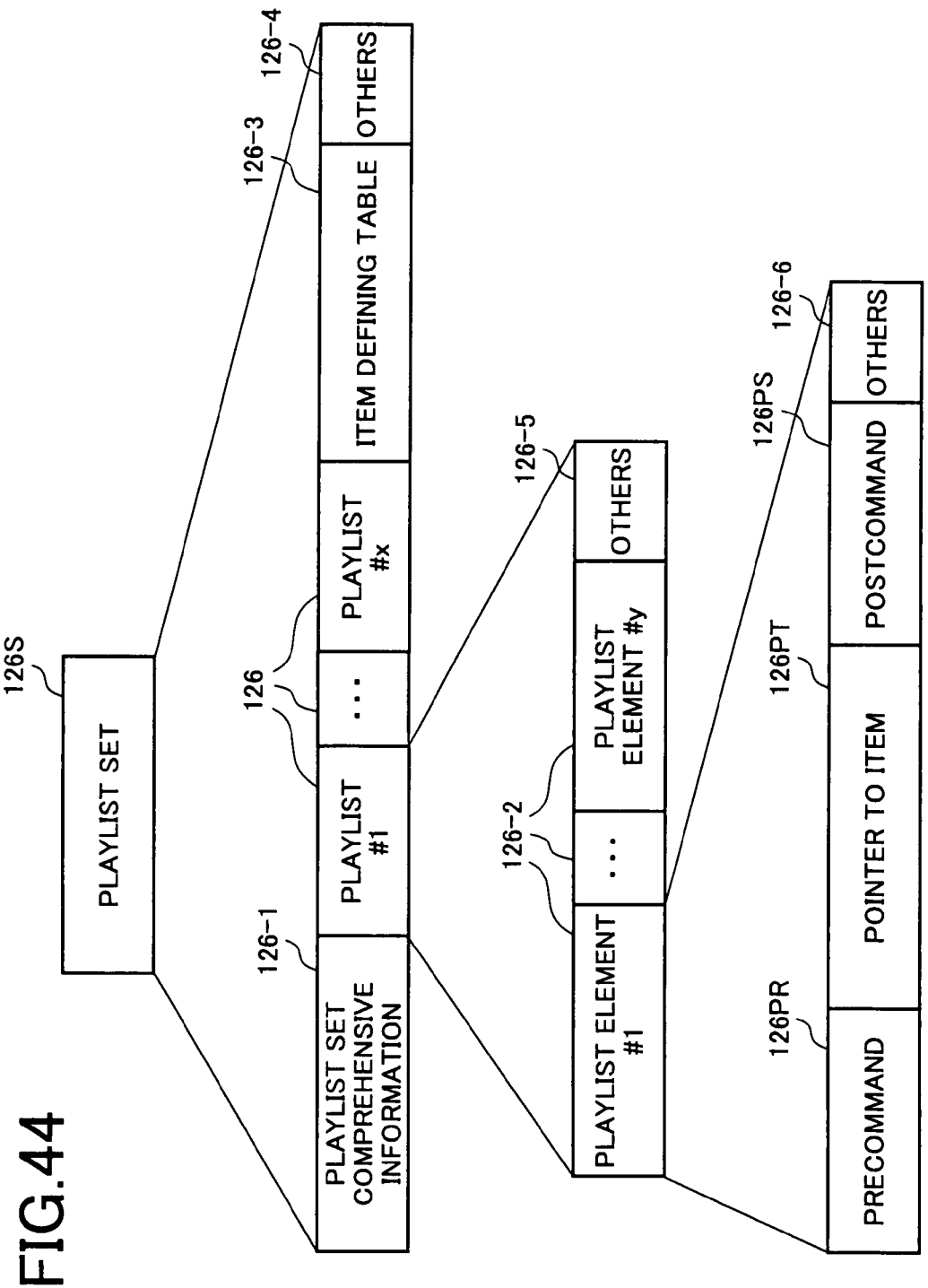

INFORMATION RECORDING/REPRODUCTION DEVICE AND INFORMATION RECORDING MEDIUM

TECHNICAL FIELD

The present invention relates to an information recording/reproduction device and an information recording medium, and, more particularly, to an information recording/reproduction device that records/deletes/divides/defragments a stream on an information recording medium and reproduces a stream recorded on the information recording medium, and to the information recording medium that records a stream of digital broadcasting data, etc., thereon.

BACKGROUND OF THE INVENTION

As an information recording medium, such as a hard disc, comes to have a greater capacity and offer higher access speed, recording of a larger volume of streams of digital broadcasting data, etc., on the information recording medium has started to grow in popularity. This circumstance has led to a demand for a function of not only recording/deleting a digital broadcasting program but also picking out a desired scene and easily reproducing a plurality of picked out scenes in free order.

An information recording medium described in a patent document 1, for example, has been provided to solve the above problem. This information recording medium records a plurality of pieces of contents information, a plurality of playlist sets each of which contains a plurality of pieces of playlist information regulating a reproduction sequence of the pieces of contents information, and title information that specifies at least one playlist set corresponding to contents information to be reproduced among the plurality of playlist sets so as to reproduce the pieces of contents information as a title, which is a logical unit of information. This configuration will be described referring to FIG. 44.

As shown in FIG. 44, a playlist set 126S includes playlist set comprehensive information 126-1, a plurality of playlists 126 (playlists #1 to #x), an item defining table 126-3, and other information 126-4. Each of the playlists 126 includes a plurality of playlist elements 126-2 (playlist elements #1 to #y) and other information 126-5. Each of the playlist elements 126-2 includes a precommand 126PR, a pointer 126PT to an item, a postcommand 126PS, and other information 126-6.

The pointer 126PT, which is an instance of second pointer information according to the patent document 1, represents the identification number of an item defined by the item defining table 126-3, which identification number corresponds to the contents information that is to be reproduced on the basis of the playlist elements 126-2 including the pointer 126PT. The pointer 126PT may represent the recording position of an item defined by the item defining table 126-3.

Patent Document 1: Japanese Laid-Open Patent Publication No. 2004-127395

DISCLOSURE OF THE INVENTION

Problems to be Solved by the Invention

A conventional method, however, lays emphasis on a simply way of data reproduction. This makes it difficult to record new image data, delete unnecessary image data, or divide a single piece of image data on an information recording medium.

In the case of the playlist of FIG. 44, for example, when another playlist is added in data recording, operation of shifting backward the item defining table 126-3 and other information 126-4 all together is always necessary. When the playlist 126#1 is deleted, for example, operation of putting forward the playlists following the playlist 126#1, item defining table 126-3, and other information 126-4 all closer together is necessary. When the playlist is divided, the playlist increases in number, so that operation of shifting backward the item defining table 126-3 and other information 126-4 all together is always necessary as in the case of data recording. Besides, when the number of the playlist is shifted because of the above operation, a portion referring to the number must be changed in response. While the playlist is described here as an example, a playlist entry or information composing playlist comprehensive information requires the same operation as in the case of the playlist.

As described above, a conventional method does not allow easy recording or deleting of information or division of recorded information.

The present invention was conceived in view of the above circumstances, and it is therefore the object of the present invention to provide an information recording/reproduction device that reduces operation of shifting information backward or putting information forward closer together upon recording/deleting/dividing information to facilitate execution of processes of recording/deleting/dividing information, and to provide an information recording medium for the information recording/reproduction device.

Means for Solving the Problems

The present invention provides the following technical means to solve the above problem and reduce operation of shifting information backward or putting information forward closer together upon recording/deleting/dividing information to facilitate the processes of recording/deleting/dividing information.

A first technical means of the present invention is an information recording/reproduction device having a recording means recording image data, comprising a means of generating first class information and second class information, the first class information referring to at least a part of the image data and the second class information referring to the first class information; a class information recording means for recording the first class information and the second class information; and a means of obtaining reference information on the first class information from the second class information, wherein the second class information includes validity information indicating validity/invalidity of the first class information, and position information indicating a recording position of the first class information, the validity information and position information being the reference information on the first class information, and wherein the class information recording means records the first class information using the validity information and position information on the first class information, the validity information and position information being obtained from the second class information.

A second technical means is the information recording/reproduction device as defined in the first technical means, comprising a means that reproduces image data using the validity information and position information on the first class information obtained from the second class information, the image data corresponding to the obtained information.

A third technical means is the information recording/reproduction device as defined in the first technical means, wherein it changes the validity information on the first class information obtained from the second class information into invalid information to invalidate the first class information.

A fourth technical means is the information recording/reproduction device as defined in the first technical means, wherein it changes the position information on the first class information obtained from the second class information into an invalid value to stop reference to the first class information.

A fifth technical means is the information recording/reproduction device as defined in the third or the fourth technical means, wherein it generates new first class information by using first class information having the validity information changed into invalid information or the position information changed into an invalid value.

A sixth technical means is an information recording medium having image data recorded thereon, the recording medium recording thereon first class information and second class information, the first class information referring to at least a part of the image data and the second class information referring to the first class information, wherein the second class information includes validity information indicating validity/invalidity of the first class information, and position information indicating a recording position of the first class information, the validity information and position information being reference information on the first class information.

A seventh technical means is an information recording medium having a Program composed of image data recorded thereon, the recording medium recording thereon a Program Reference (PGR) referring to at least a part of the Program; a Program Reference Group (PGRG) referring to the PGR; a Program Reference Manager (PGRM) collectively recording the PGR and reference information on the PGR; and a Program Reference Group Manager (PGRGM) collectively recording the PGRG and reference information on the PGRG.

An eighth technical means is the information recording medium as defined in the seventh technical means, wherein the medium has recorded thereon a User Defined Favorite Folder (UDFF) referring to the PGR or to the PGRG; and a User Defined Favorite Folders Table (UDFFT) collectively recording the UDFF and reference information on the UDFF.

A ninth technical means is the information recording medium as defined in the seventh or the eighth technical means, wherein the PGRM or the PGRGM or the UDFF records reference information of reference to the PGR or to the PGRG, and wherein the reference information includes validity information indicating validity/invalidity of the PGR or the PGRG to be referenced.

A tenth technical means is the information recording medium as defined in the ninth technical means, wherein the medium is capable of recording a state of not making reference to both of the PGR and the PGRG as the reference information of reference to the PGR or to the PGRG.

Effect of the Invention

According to the present invention, operation of shifting information backward or putting information forward closer together can be reduced upon recording/deleting/dividing information. This facilitates execution of processes of recording/deleting/dividing information.

BRIEF DESCRIPTION OF THE DRAWINGS

FIG. 4 is an explanatory view of an example of information that is recorded in a file having the data structure of FIG. 3.

FIG. 8 is a diagram of an example of the structure of a PGRM and a PGR before execution of recording.

FIG. 9 is a diagram of an example of the corresponding relation between reference pointers and the PGR to which the reference pointers refer.

FIG. 10 is a diagram of an example of the structure of the PGRM and the PGR before execution of a deletion process.

FIG. 32 is a diagram of an example of the data structure of UDFFI_GI.

FIG. 33 is a diagram of an example of the data structure of Dstring[n].

FIG. 34 is a diagram of an example of the data structure of a reference pointer (PTR).

FIG. 42 is a diagram of an example of the data structure of PGRM_GI.

FIG. 43 is a diagram of an example of the data structure of PGRI_SRP.

FIG. 44 is an explanatory view of a conventional technique.

EXPLANATION OF REFERENCE NUMERALS

Figure 1:
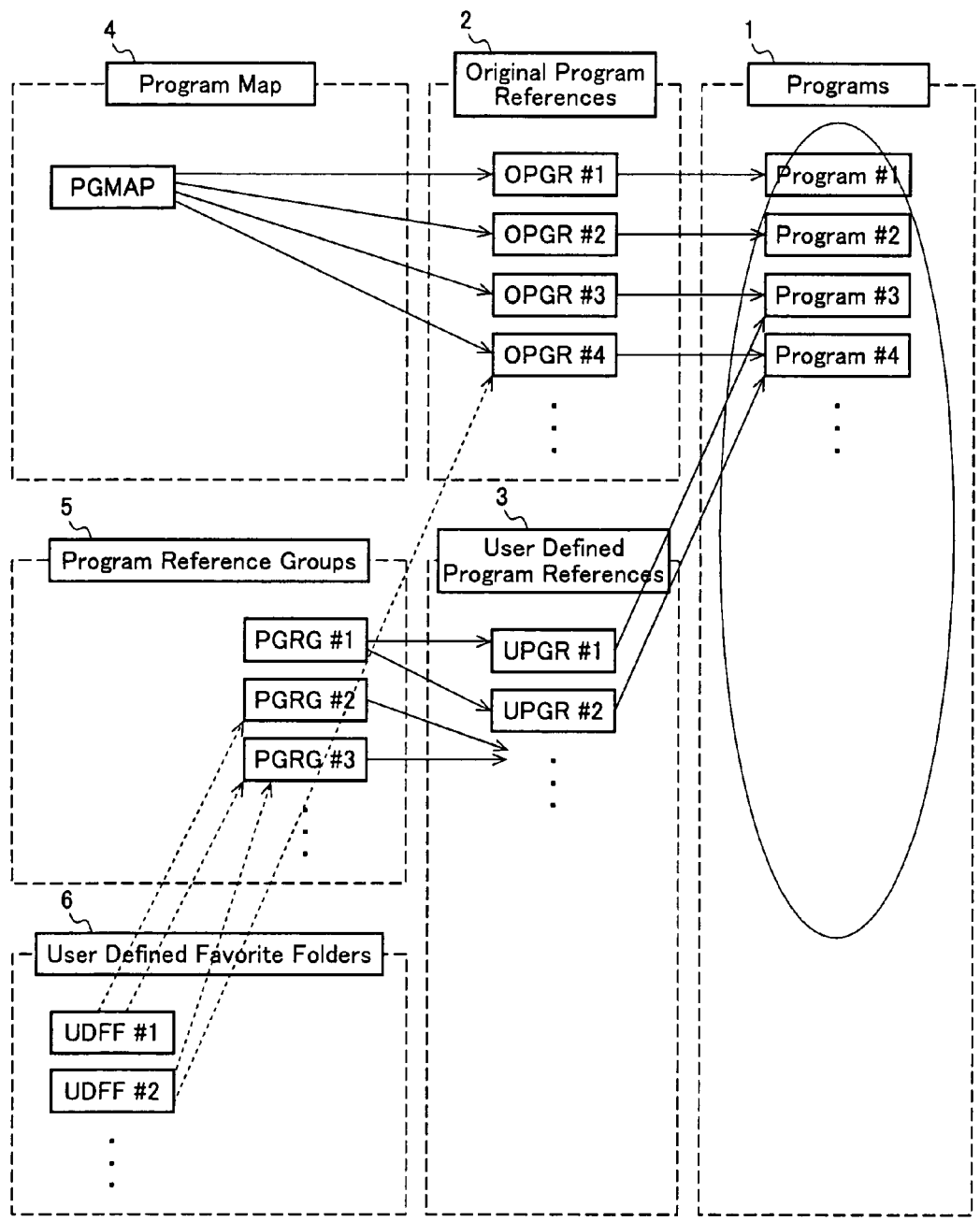
FIG. 1 is an explanatory view of the outline of a data structure on an information recording medium according to the present invention.

1 . . . Programs; 2 . . . Original Program References (OPGR); 3 . . . User Defined Program References (UPGR); 4 . . . Program Map (PGMAP); 5 . . . Program Reference Groups (PGRG); 6 . . . User Defined Favorite Folders (UDEF); 7 . . . Directory; 8 . . . File; 9 . . . Stream Directory; 10 . . . Named Streams; 20 . . . information recording/reproduction device; 21 . . . external input/output I/F; 22 . . . receiving portion; 23 . . . user I/F; 24 . . . controlling portion; 25 . . . encrypting portion; 26 . . . reproducing portion 27 . . . buffer; 28 . . . operation input means; 29 . . . display means; and 30 . . . removable recording medium.

PREFERRED EMBODIMENTS OF THE INVENTION

According to the present invention, a removable hard disc is used as an information recording medium, but the type of the information recording medium is not limited to the removable hard disc. Any recording medium allowing random access and high-speed access is applicable, and such a recording medium includes a hard disc built in an information recording/reproduction device, a readable/writable DVD, and a magnetic optical disc. A procedure of recording or reproducing image data on the information recording medium is the same as that on an existing hard disc recorder, etc.

The information recording/reproduction device of the present invention includes a means that records image data, etc., a means that generates first class information referring to at least a part of the image data, etc., and second class information referring to the first class information, a means that records the first class information and second class information, and a means that obtains reference information on the first class information from the second class information. The second class information includes validity information indicating the validity/invalidity of the first class information, and position information indicating the recording position of the first class information, the validity information and position information being the reference information on the first class information. The information recording/reproduction device is so configured as to be able to record the first class information using the validity information and position information on the first class information obtained from the second class information.

In the following embodiments, image data, etc., may be defined as "Programs", the first class information may be defined as "Original Program References (OPGR)", "User Defined Program References (UPGR)", and "Program Reference Groups (PGRG)", and the second class information may be defined as "Program Reference Manager (PGRM)" and "Program Reference Group Manager (PGRGM)". Also, the first class information may be defined as "Programs", and the second class information may be defined as "OPGR" and "UPGR". Further, the first class information may be defined as "OPGR" and "UPGR", and the second class information may be defined as "PGRG". In the following embodiments to be described, image data will be described as a typical example of various data including image data, but the present invention can apply to different types of data, such as sound data, other than image data.

First Embodiment

The present embodiment relates to an information recording medium recording image data thereon, and an information recording/reproduction device recording encrypted contents on the information recording medium.

FIG. 1 is an explanatory view of the outline of a data structure on the information recording medium according to the present invention. In FIG. 1, 1 denotes Programs, 2 denotes Original Program References (OPGR), 3 denotes User Defined Program References (UPGR), 4 denotes Program Map (PGMAP), 5 denotes Program Reference Groups (PGRG), and 6 denotes User Defined Favorite Folders (UDFF). The PGMAP 4 refers to one or more OPGRs 2. In a reversed point of view, the PGMAP 4 is a list of OPGRs 2. Likewise, PGRM, which is not shown, is a list of OPGRs 2 and UPGRs 3, and PGRGM, which is not shown, is a list of PGRGs 5, and UDFFT (User Defined Favorite Folders Table) is a list of UDFFs 6. The PGRG 5 refers to one or more UPGRs 3.

The PGRG is, for example, taken to be equivalent to a playlist, and the UDFF is, for example, taken to be equivalent to a folder or data structure in which favorite titles can be brought together. A title means image data itself, such as one movie and one TV program, serving as a recording unit or reproduction unit for image data. A playlist, for example, consists of one or more of a user's favorite scenes arranged in the order of the user's favor. The user is, therefore, allowed to pick out a desired scene from the playlist and reproduce the scene.

In FIG. 1, the Programs 1 represents image data. The Programs 1 consist of Programs each represented as Program #1, Program #2, Program #3, Program #4, - - - . The whole of a Program is always subjected to reference from one PGR, which is represented as OPGR 2. In the example of FIG. 1, an OPGR #1 refers to the whole of the Program #1, an OPGR #2 refers to the whole of the Program #2, an OPGR #3 refers to the whole of the Program #3, and an OPGR #4 refers to the whole of the Program #4. Besides, every OPGR is subjected to reference from the PGMAP 4. The PGMAP 4, therefore, can refer to all of the Programs composing the Programs 1.

In addition to the above structure, the UPGR 3 and the PGRG 5 are defined as a data structure provided mainly for enabling a variety of patterns of reproduction. The UPGR 3 refers to any part or the entire segments of one Program. The PGRG 5 refers to one or more UPGRs 3. In addition, the UDFF 6 is defined as a data structure provided mainly for classifying and arranging image data. The UDFF 6 refers to one or more PGRGs 5 or OPGRs 2.

In the example of FIG. 1, a UPGR #1 refers to the Program #3, and a UPGR #2 refers to the Program #4. A PGRG #1 refers to the UPGR #1 and the UPGR #2, and a PGRG #2 and a PGRG #3 refers to a UPGR not shown. A UDFF #1 refers to the PGRG #2 and the PGRG #3, and a UDFF #2 refers to the PGRG #3 and an OPGR #4.

Figure 2:
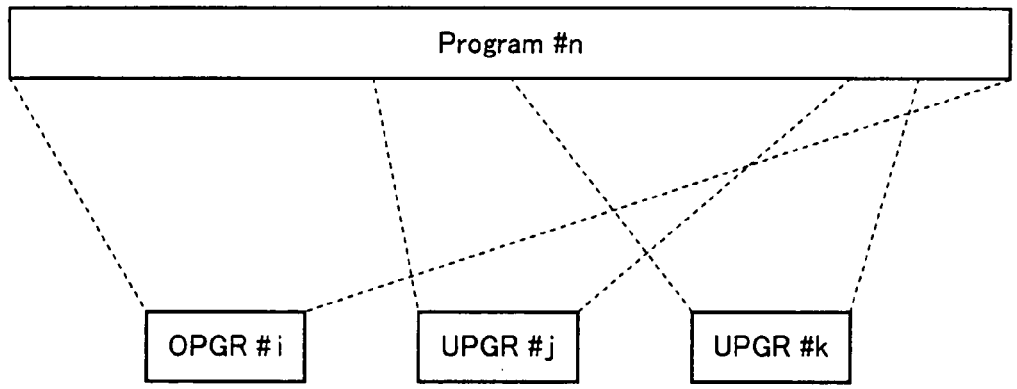
FIG. 2 is an explanatory view of an example of the data structure of a Program and PGRs referring to the Program.

FIG. 2 is an explanatory view of an example of the data structure of a Program and PGRs referring to the Program. In FIG. 2, the whole of the Program #n is subjected to reference from an OPGR #i, and a part of the Program #n is subjected to reference from a UPGR #j and from a UPGR #k. As described here, the whole of the Program is always subjected to reference from one OPGR.

Figure 3:
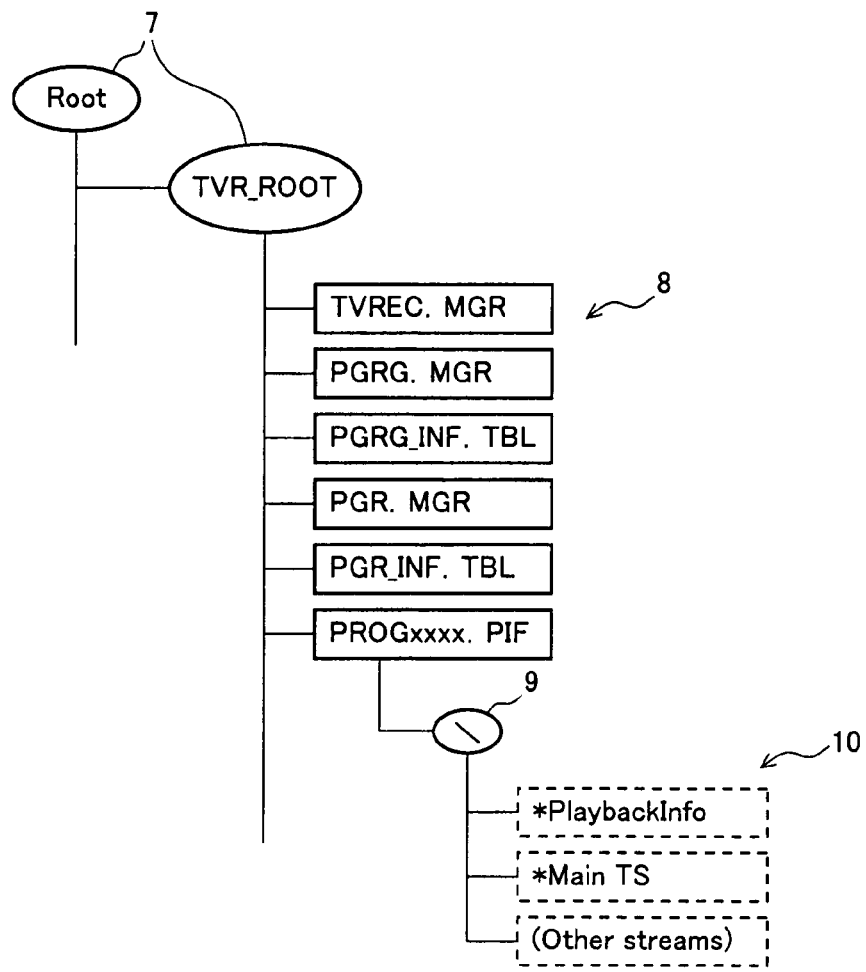
FIG. 3 is an explanatory view of an example of the structure of the data of FIG. 2 on a file system.

FIG. 3 is an explanatory view of an example of the structure of the data of FIG. 2 on a file system. In FIG. 3, 7 denotes Directory, 8 denotes File, 9 denotes Stream Directory, and 10 denotes Named Streams. According to the present embodiment, UDF (Universal Disk Format) is employed as a file system, but the file system is not limited to the UDF.

FIG. 4 is an explanatory view of an example of information that is recorded in a file having the data structure of FIG. 3. A directory named TVR_ROOT is located underneath the Root Directory shown in FIG. 3, and relevant files are located underneath the Directory TVR_ROOT. Each of the files mainly records information shown in FIG. 4(A). Each Program records information in files shown in FIG. 4(B).

The detail of the data structures described in FIGS. 1, 2, and 3 will be given in a separate explanation. According to the above description, the PGRG refers only to the UPGR, but the PGRG may refer also to the OPGR in another configuration. In such a case, the PGRG refers to one or more OPGRs or UPGRs. While the UPGR is always subject to reference from the PGRG according to the above description, the UPGR may be allowed to be free from reference from the PGRG. While the UDFF refers to the PGRG and the OPGR according to the above description, the UDFF may be caused to refer only to the PGRG, or may be allowed to refer also to the UPGR in another configuration.

Figure 5:
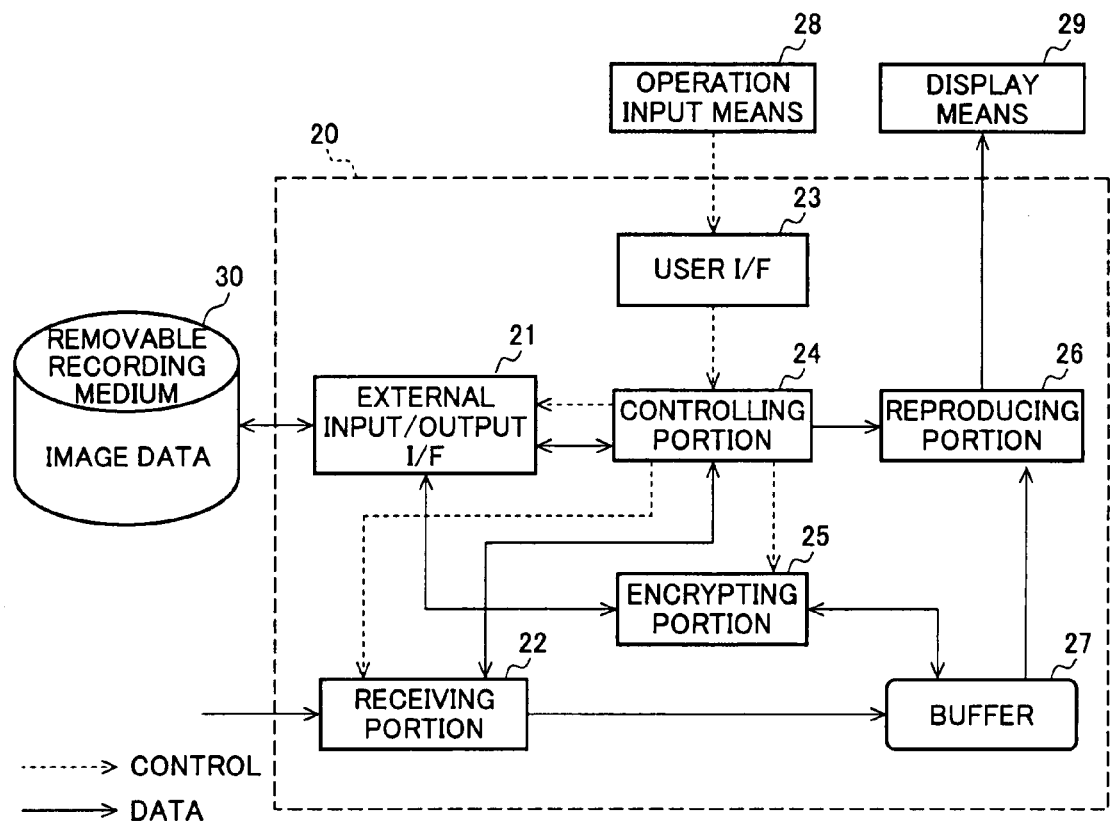
FIG. 5 is a block diagram of an example of the basic configuration of an information recording/reproduction device according to one embodiment of the present invention.

FIG. 5 is a block diagram of an example of the basic configuration of the information recording/reproduction device according to one embodiment of the present invention. In FIG. 5, 20 denotes the information recording/reproduction device, which includes an external input/output interface (I/F) 21 that connects a removable recording medium 30 removably to the information recording/reproduction device, a receiving portion 22 for image data input, a user I/F 23 that receives an input operation signal from an operation input means 28, a controlling portion 24 having a CPU, memory, etc., which controlling portion 24 controls the information recording/reproduction device 20, an encrypting portion 25 that encrypts and decrypts image data, a reproducing portion 26 that reproduces image data, and a buffer 27 that temporarily keeps image data. The operation input means 28 and a display means 29 are so arranged as to be integral with or connected externally to the information recording/reproduction device 20. The removable recording medium 30 is arranged to be independent of the information recording/reproduction device 20 and is connected removably to the information recording/reproduction device 20. In FIG. 5, dotted line arrows represent the flow of a control signal, and continuous line arrows represent the flow of a data signal.

The above portions will be described further in detail. The external input/output I/F 21 is the interface that connects the information recording/reproduction device 20 to the removable recording medium 30. The external input/output I/F 21 has a mechanism for attaching/detaching the removable recording medium 30, and an interface carrying out data reading/writing. The receiving portion 22 is a means for image data input. The receiving portion 22 may be, for example, a tuner that receives a digital broadcasting signal or an analog broadcasting signal, or such an input means as IEEE 1394 interface, or an input means that receives input from a digital camera.

The user I/F 23 is the portion that selects an operation executed by the information recording/reproduction device 20, such as channel selection in digital broadcasting and recording/reproducing operation. The controlling portion 24 is the portion that controls each component portion on the basis of input from the user I/F 23. The encrypting portion 25 is the portion that encrypts and decrypts image data. The reproducing portion 26 is the portion that reproduces image data. The buffer 27 is the buffer that temporarily accumulates data for reception or reproduction. The operation input means 28 is the means for a user to operate the information recording/reproduction device 20. The display means 29 displays image data and OSD (On Screen Display) made by the user I/F 23. The removable recording medium 30 mainly records encrypted video (image) data.

The external input/output I/F 21 has the interface executing data reading/writing on the removable recording medium 30, and, according to the present embodiment, this interface is provided as, for example, an ATA (AT Attachment) interface. However, the ATA interface may be replaced with a USB (Universal Serial Bus), IEEE1394 interface, etc. According to the present embodiment, the receiving portion 22 is the means that receives a digital broadcasting signal. With regard to the configuration of data reading/writing on the removable recording medium 30 and the receiving portion 22 receiving a digital broadcasting signal, the same configuration is included in a conventional hard disc built-in type digital broadcasting receiving device.

The encrypting portion 25 encrypts and decrypts image data using, for example, a common key cryptography. For example, triple DES (Data Encryption Standard), AES (Advanced Encryption Standard), etc., can be used as the common key cryptography. The encrypting portion 25 is not an essential component when image data is not encrypted. The reproducing portion 26 is a decoder that decodes image data.

The operation input means 28 is provided typically as an operational remote controller, a button on the information recording/reproduction device 20, etc. The display means 29 is such a display device as a liquid crystal display, plasma display, and EL (Electroluminescent) display. The removable recording medium 30 is a removable hard disc.

The information recording/reproduction device 20 includes the removable recording medium 30 that records the Program composed of image data, and the controlling portion 24 that generates the PGR referring to at least a part of the Program, the PGRG referring to the PGR, the PGRM collectively recording reference information on the PGR, and the PGRGM collectively recording reference information on the PGRG. The removable recording medium 30 records the PGR, PGRM, PGRG, and PGRGM.

Upon recording the PGR, the information recording/reproduction device 20 refers to reference information contained in the PGRM. When invalid reference information or reference information making no reference to any PGR is present, the information recording/reproduction device 20 may record the PGR using such invalid reference information. Upon recording the PGRG, the information recording/reproduction device 20 refers to reference information contained in the PGRGM. When invalid reference information or reference information making no reference to any PGRG is present, the information recording/reproduction device 20 may record the PGRG using such invalid reference information. Even if invalid reference information is present, the PGR or the PGRG may be added to the rear of other information or recorded in an area that is secured in advance.

The controlling portion 24 has a means that changes any of a plurality of data out of the PGR, PGRM, PGRG, and PGRGM. When deleting the PGR, the controlling portion 24 invalidates reference information on the PGR contained in the PGRM. Likewise, when deleting the PGRG, the controlling portion 24 invalidates reference information on the PGRG contained in the PGRGM.

The controlling portion 24 may have a means that changes any of a plurality of data out of the Program, PGR, PGRM, PGRG, and PGRGM. When dividing the Program, the controlling portion 24 divides the PGR referring to the Program, and then modifies the PGRG referring to the divided PGR.

When defragmenting a PGR list recorded on PGR_INF.TBL, for example, the controlling portion 24 temporarily makes another PGR list file named PGR_INF.TMP, and processes every piece of reference information on the PGR contained in the PGRM in such a way that when the reference information is valid, the PGR to which the reference information refers is copied onto another PGR list file, and that when the reference information is invalid, the reference information in the PGRM is brought into a state of making no reference to any PGR. When the process on every piece of reference information on the PGR is over, the PGR_INF.TBL is replaced with the PGR_INF.TMP.

Likewise, when defragmenting a PGRG list recorded on PGRG_INF.TBL, for example, the controlling portion 24 temporarily makes another PGRG list file named PGRG_INF.TMP, and processes every piece of reference information on the PGRG contained in the PGRGM in such a way that when the reference information is valid, the PGRG to which the reference information refers is copied onto another PGRG list file, and that when reference information is invalid, the reference information in the PGRGM is brought into a state of making no reference to any PGRG. When the process on every piece of reference information on the PGRG is over, the PGRG_INF.TBL is replaced with the PGRG_INF.TMP.

The controlling portion 24 has a means that analyzes the PGRG, and the reproducing portion 26 can reproduce the PGRG on the basis of an analysis result.

In another embodiment, the information recording/reproduction device 20 may be so configured as to include the removable recording medium 30 that records the Program composed of image data, and the controlling portion 24 that generates the PGR referring to at least a part of the Program, the PGRG referring to the PGR, the UDFF referring to the PGR or the PGRG, and the UDFFT collectively recording the UDFF and reference information on the UDFF. The removable recording medium 30 records the PGR, PGRG, UDFF, and UDFFT.

Upon recording the UDFF, the information recording/reproduction device 20 refers to reference information contained in the UDFFT. When invalid reference information or reference information making no reference to any UDFF is present, the information recording/reproduction device 20 may record the UDFF using such invalid reference information.

The controlling portion 24 has a means that changes any of a plurality of data out of the UDFF and UDFFT. When deleting the UDFF, the controlling portion 24 may invalidate reference information on the UDFF contained in the UDFFT.

The controlling portion 24 may have a means that changes any of a plurality of data out of the Program, PGR, PGRG, and UDFF. When dividing the Program, the controlling portion 24 divides the PGR referring to the Program, and then modifies the PGRG referring to the divided PGR.

Figure 6:
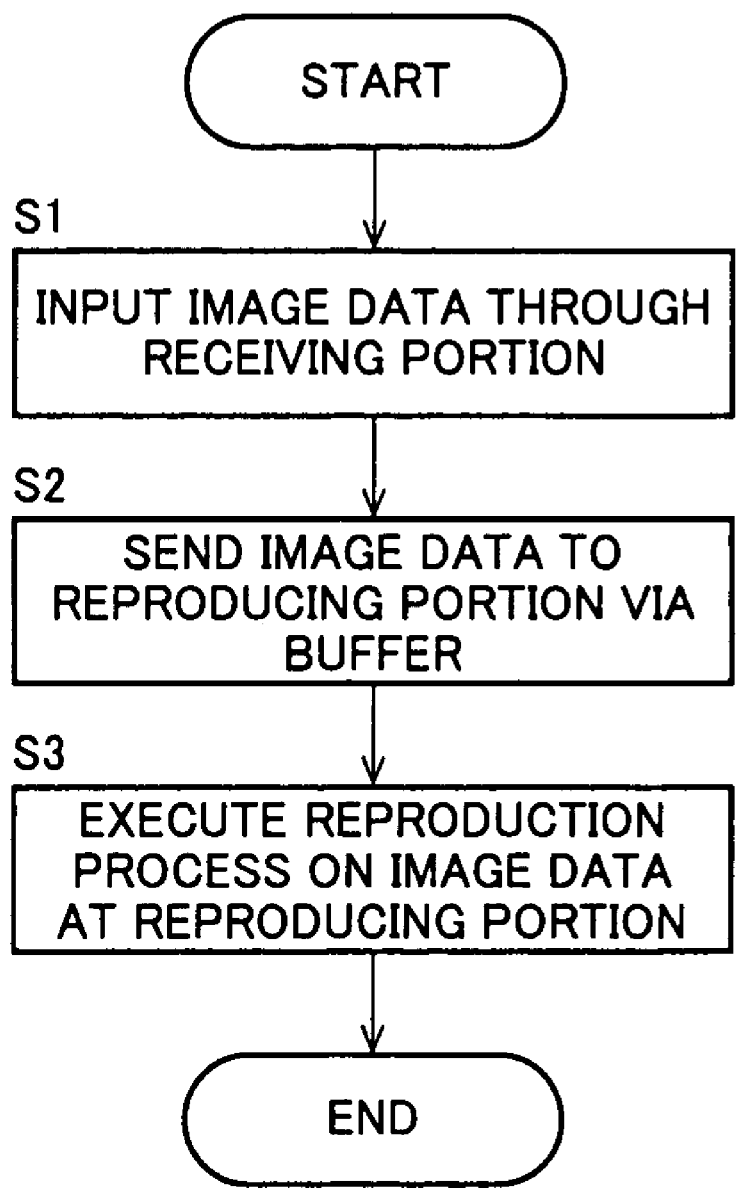
FIG. 6 is a flowchart for explaining an example of a procedure executed by an information recording/reproduction device according to a first embodiment of the present invention.

FIG. 6 is a flowchart for explaining an example of a procedure executed by the information recording/reproduction device 20 according to the first embodiment of the present invention. A process to be executed in an ordinary state of viewing is described here. First, the information recording/reproduction device 20 inputs image data through the receiving portion 22 (step S1). This image data is a TS (Transport Stream) or a PS (Program Stream) that is selected digital broadcasting. A channel to select, which is not shown in the flowchart, has been selected in advance by the operation input means 28 via the user I/F 23. The controlling portion 24 puts information of the channel to select from the user I/F 23 into the receiving portion 22, which carries out operation of channel selection on the basis of the information.

Then, the information recording/reproduction device 20 temporarily accumulates the image data from the receiving portion 22 in the buffer 27, and the reproducing portion 26 receives the image data input from the buffer 27 (step S2). Finally, the reproducing portion 26 decodes the image data to output the image data to the display means 29 (step S3).

Figure 7:
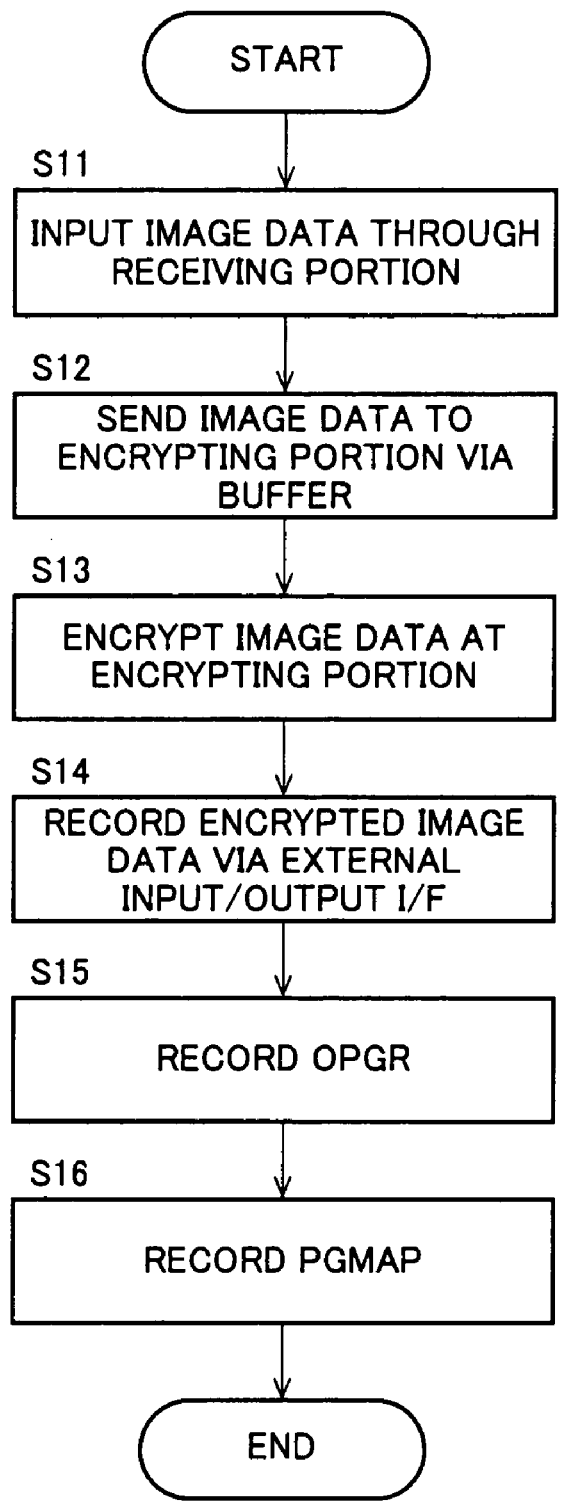
FIG. 7 is a flowchart for explaining an example of a procedure executed by the information recording/reproduction device on execution of recording.

Operation of the information recording/reproduction device 20 on execution of recording on the information recording medium will then be described. FIG. 7 is a flowchart for explaining an example of a procedure executed by the information recording/reproduction device 20 on execution of recording. FIG. 8 depicts an example of the structure of the PGRM and the PGR before execution of recording. The corresponding relation between reference pointers and the PGR to which the reference pointers refer is depicted in FIG. 9.

Referring to FIGS. 8 and 9, the PGRM is composed of Program References Information General Information (PGRI_GI), and one or more Program Reference Information Search Pointers (PGRI_SRP) making reference. The PGR is composed of one or more Program Reference Information (PGRI). An ID is appended to the PGR in the order of the PGRI_SRP, and the head ID is 1. According to the present embodiment, 9999 PGRI_SRPs can be stored in the PGRM, which makes the maximum ID 9999. The maximum of the ID and PGRI_SRP is not limited to 9999, but can be determined to be any number.

Referring to FIG. 7, a Program is recorded first upon execution of recording. At step S11, input image data is received at the receiving portion 22. The input process of the image data is the same as the process at step S1 executed in the above state of view. At step S12, the image data from the receiving portion 22 is sent to the encrypting portion 25 via the buffer 27. At step S13, the encrypting portion 25 encrypts the image data from the buffer 27. Information needed for data decrypting is set from PROGxxxx. PIF. At step S14, the encrypted image data is recorded on the removable recording medium 30 via the external input/output I/F 21. This encrypted image data constitutes the Program.

At step S15, the PGR for reference to the Program is recorded. This PGR is the OPGR corresponding to the Program in one-to-one relation, referring to the head through the last segment of the Program. When the Program is recorded, reference to the PGR. MGR is made to obtain the contents of reference pointers (PGRI_SRP) in order from the head pointer and check the validity or invalidity of each reference pointer. At this time, when an invalid reference pointer or a pointer making no reference to any PGR is present, the recording may be executed using such an invalid pointer. Besides, when an invalid reference pointer is present, another PGR or PGRG may be added rearward, or recorded in an area that has been secured in advance.

According to the present embodiment, as shown in FIG. 8, recorded PGRI_SRP #1, PGRI_SRP #2, PGRI_SRP #3 are all valid, and a PGRI_SRP #4 is added as the last pointer to the PGR. MGR. This leads to a change of the PGRI_GI, the structure of which will be described later. In response to addition of the PGRI_SRP #4, a PGRI #4 is added as the last PGRI to the PGR_INF.TBL to make a change that causes the PGRI_SRP #4 to refer to the PGRI #4.

At step S16, the OPGR (PGRI #4) is added to the PGMAP.

In the above process, a generating portion (not shown) in the controlling portion 24 generates the PGRI_SRP/PGRI/PGRM/PGMAP, and encrypted image data is recorded on the removable recording medium 30 via the external input/output I/F 21. When the recordable number of PGRI_SRPs is limited and the number of PGRI_SRPs to record exceeds the recordable number, the process should preferably be suspended and display indicating exceeding of the limited number be put on the display means 29 via the reproducing portion 26.

While the process to execute upon recording a new Program is described above, the UPGR referring to a part of the Program and the PGRG referring to the UPGR can also be recorded through an editing process. In such a case, the UPGR referring to the selected part of the Program is recorded on the PGR. MGR and the PGR_INF.TBL through the same process as executed at step S15. Then, the UPGR is recorded on the PGRG through the same process as executed at step S16. In this editing process, user input from the operation input means 28 is put into the information recording/reproduction device 20 via the user I/F 23 to select the part to refer to. This process can be executed as a process equivalent to an editing process in a hard disc recorder and a DVD recorder.

A process of recording any desired PGRG or OPGR on the UDFF is the same as the above editing process. The PGRG or OPGR to be recorded is selected by user input from the operation input means 28 via the user I/F 23. Subsequently, through the same process as executed at step S15, the selected PGRG or OPGR is recorded on the UDFF. Likewise, in recording the UDFF on the UDFFT, the UDFF is recorded on the UDFFT through the same process as executed at step S16.

Second Embodiment

Figures 11, 12:
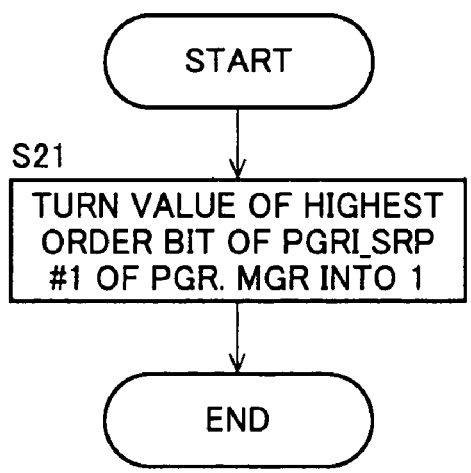
FIG. 11 is a diagram of another example of the corresponding relation between the reference pointers and the PGR to which the reference pointers refer.
FIG. 12 is a flowchart for explaining an example of a deletion process executed by an information recording/reproduction device according to a second embodiment of the present invention.

A procedure of deleting an unnecessary PGR will be described as another embodiment. FIG. 10 is a diagram of an example of the structure of the PGRM and the PGR before execution of a deletion process. The corresponding relation between the reference pointers and the PGR to which the reference pointers refer is depicted in FIG. 11. Referring to FIG. 11, an instance of deleting a PGRI #1 will be described. In this case, the reference point of the PGRI_SRP #1 referring to the PGRI #1 is invalidated.

A deletion process flow will be described referring to FIG. 12. At step S21, a changing portion (not shown) in the controlling portion 24 turns the value of the highest order bit of the PGRI_SRP #1 into 1, the PGRI_SRP #1 being included in the PGR. MGR on the removable recording medium 30, via the external input/output I/F 21. The highest order bit serves as a flag indicating the validity/invalidity of the PGRI_SRP, indicating invalidity when taking the value of 1 while indicating validity when taking the value of 0.

Figures 13, 14:
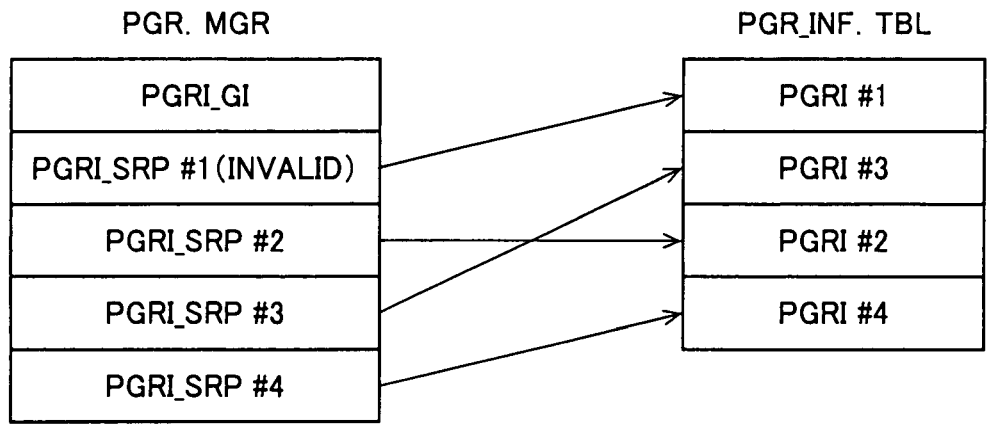
FIG. 13 is a diagram of an example of the structure of the PGRM and the PGR after execution of the deletion process.
FIG. 14 is a diagram of still another example of the corresponding relation between the reference pointers and the PGR to which the reference pointers refer.

FIG. 13 is a diagram of an example of the structure of the PGRM and the PGR after execution of the deletion process. The corresponding relation between the reference pointers and the PGR to which the reference pointers refer is depicted in FIG. 14.

The PGRI #1 can be deleted through the simple procedure as described above.

While the above description relates to deletion of the PGR, the same procedure as described above enables deletion of the PGRG/UDFF/UDFFT.

When the PGR is deleted, the reference part of PGMAP/PGRG/UDFF, etc., that refers to the PGR must also be deleted. Likewise, when the PGRG is deleted, the reference part of UDFF that refers to the PGRG must also be deleted. A procedure of deletion is the same as the above deletion procedure.

Third Embodiment

An example of a procedure of dividing a PGR will be described as another embodiment.

Figure 15:
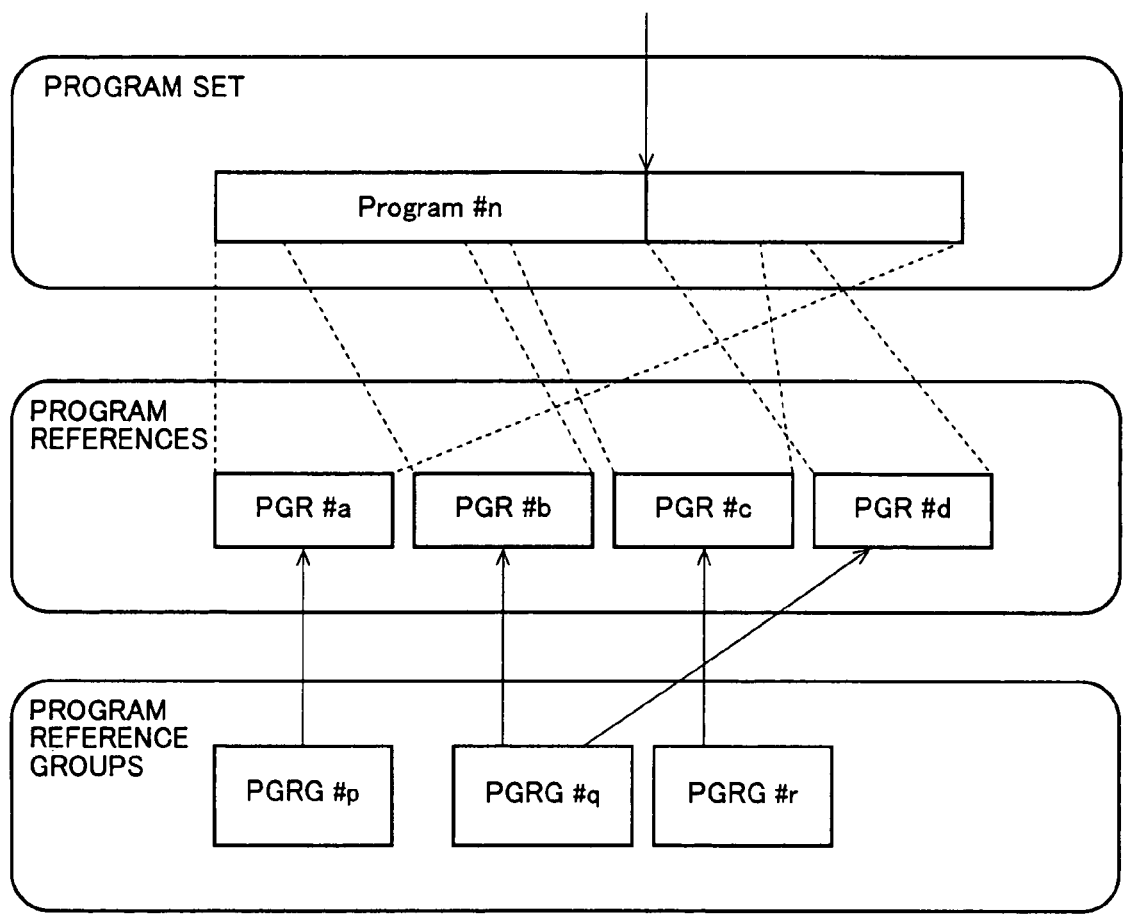
FIG. 15 is an explanatory view of an example of the relation between the PGRG/PGR/Program before execution of a division process.

FIG. 15 is an explanatory view of an example of the relation between the PGRG/PGR/Program before execution of a division process. In FIG. 15, the following relation is established.

A Program #n is subjected to reference from a PGR #a, a PGR #b, a PGR #c, and a PGR #d.
The PGR #a is subjected to reference from a PGRG #p.
The PGR #b is subjected to reference from a PGRG #q.
The PGR #c is subjected to reference from a PGRG #r.
The PGR #d is subjected to reference from the PGRG #q.

In the present embodiment, an instance of dividing the Program #n at an arrowed spot will be described.

Figure 16:
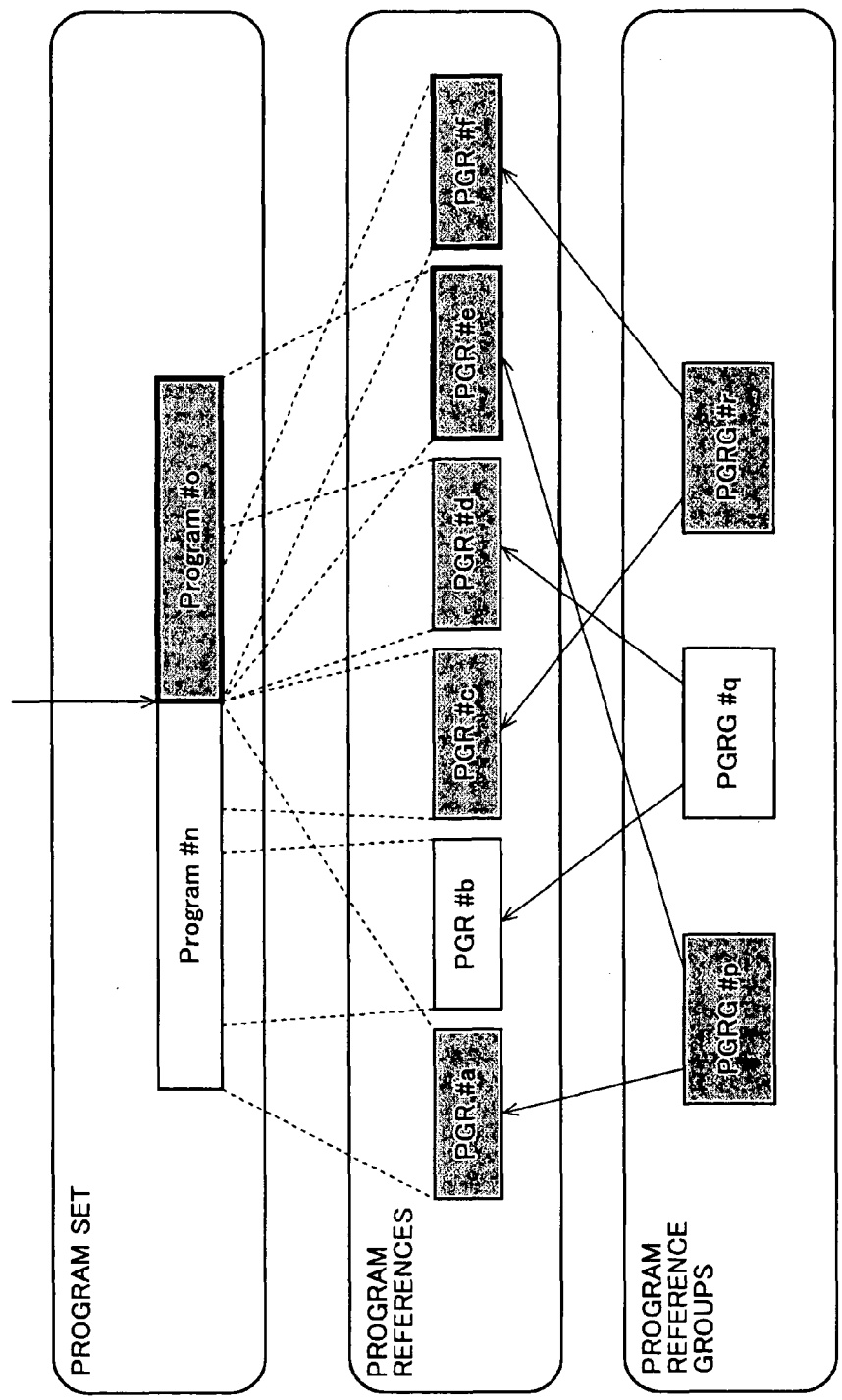
FIG. 16 is an explanatory view of an example of the relation between the PGRG/PGR/Program after execution of the division process.

FIG. 16 is an explanatory view of an example of the relation between the PGRG/PGR/Program after execution of the division process. Referring to FIG. 16, when division of the Program #n is over, a Program #o, a PGR #a, a PGR #c, the PGR #d, a PGR #e, a PGR #f, the PGRG #p and the PGRG #r have been generated or changed to establish the following relation.

The Program #n has been divided to generate the Program #o.
The segment the PGR #a refers to has become the segment ending at the arrow.
The remaining part of the PGR #a making reference has been newly generated as the PGR #e.
The remaining part of the PGR #c making reference has been newly generated as the PGR #f.
The PGRG #p has come to refer to the PGR #a and the PGR #e.

The PGRG #r has come to refer to the PGR #c and the PGR #f.

Figure 17:
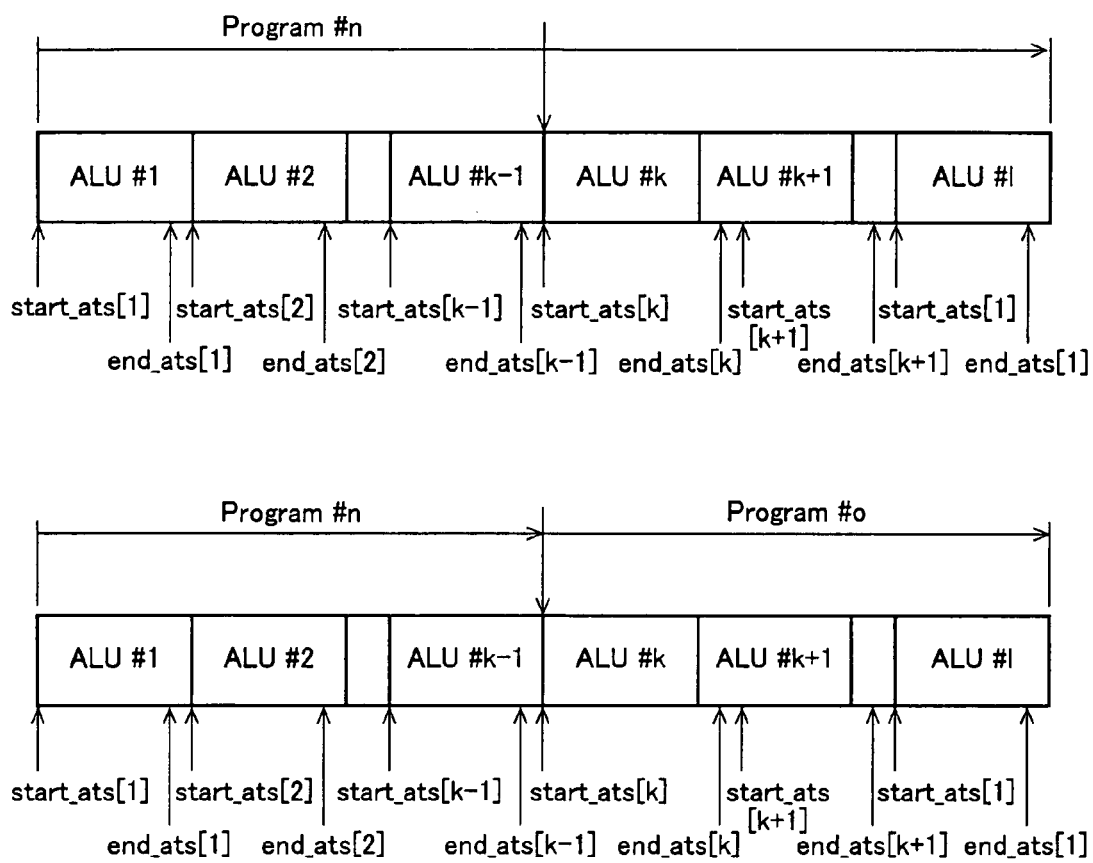
FIG. 17 is an explanatory view of an example of the relation between the Program and an ALU that results when a Program #n is divided.

The structure of the Program #n and the Program #o will be described referring to FIG. 17. FIG. 17 is an explanatory view of an example of the relation between the Program and an ALU (Allocation Unit) that results when the Program #n is divided. The ALU is a unit for reading/writing image data. When the original Program #n is composed of one ALU, and is divided at the spot between (k−1)th ALU and kth ALU, the original Program #n after the division consist of k−1 ALUs, and the newly generated Program #o consists of l−k+1 ALUs. A procedure of executing such division will be described referring to a flowchart of FIG. 18.

Figures 18, 19:
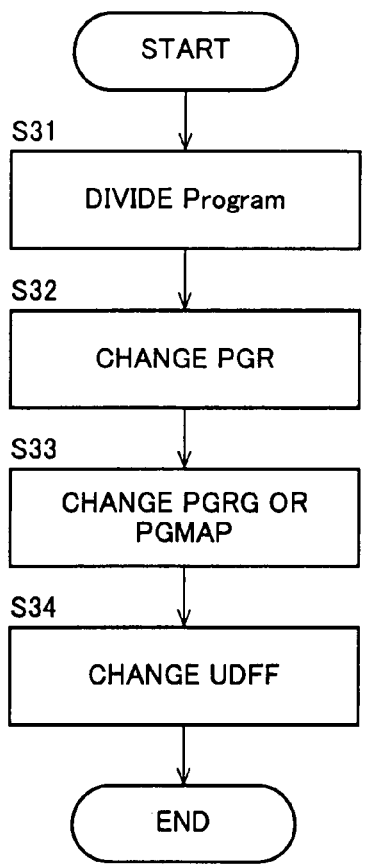
FIG. 18 is a flowchart for explaining an example of a division process executed by an information recording/reproduction device according to a third embodiment of the present invention.
FIG. 19 is a diagram of still another example of the corresponding relation between the reference pointers and the PGR to which the reference pointers refer.

Referring to FIG. 18, a Program is divided first at step S31, where reference start points and reference end points on the original Program (Program #n according to the present embodiment) are changed, and a new Program (Program #o according to the present embodiment) is generated. Subsequently at step S32, the PGR referring to the Program is changed. The PGR to refer only to the original Program after the division is left as it is. This PGR is equivalent to the PGR #b shown in FIG. 16 according to the present embodiment. For the PGR to refer only to the newly generated Program, the Program to which the PGR refers is changed. This PGR is equivalent to the PGR #d shown in FIG. 16 according to the present embodiment. The PGR to refer to both original Program and newly generated Program is divided to modify the original reference points of the PGR and generate a new PGR. This PGR to be divided is equivalent to the PGR #a and to the PGR #c shown in FIG. 16 according to the present embodiment.

At step S33, the PGRG or the PGMAP is changed in response to the change of the PGR. When the PGR divided at step S32 is the UPGR, the PGRG referring to the UPGR is so changed as to refer to two PGRs resulting from the division. When the divided PGR is the OPGR, the PGMAP is so changed as to refer to resulting two PGRs. According to the present embodiment, the PGRG #p is so changed as to refer to the PGR #a and the PGR #e, and the PGRG #r is so changed as to refer to the PGR #c and the PGR #f, as shown in FIG. 16.

At step S34, the UDFF is changed in response to the change of the PGRG or PGMAP. When the OPGR or PGRG making reference is divided, the UDFF is so changed as to refer to two OPGRs or PGRGs resulting from the division. The above procedure is carried out as the changing portion (not shown) in the controlling portion 24 changes data on the removable recording medium 30 via the external input/output I/F 21. Thus, the Program can be divided in the above manner.

Fourth Embodiment

A procedure of the so-called defragmentation process will be described as another embodiment. The defragmentation process is the process of deleting an invalid part from the PGR_INF.TBL/PGRG_INF.TBL/UDFF list (in TVREC. MGR), which have come to contain the invalid part as a result of processes described in the above embodiments. The above FIG. 13 depicts an example of the structure of the PGRM and the PGR before execution of a defragmentation process. The corresponding relation between the reference pointers and the PGR to which the reference pointers refer is depicted in FIG. 19.

As shown in FIG. 19, the PGRI_SRP #1 is invalid, which makes the PGRI #1, to which the PGRI_SRP #1 refers, also invalid. The PGRI #1 thus becomes unnecessary, and is deleted from the PGR_INF.TBL. This reduces the size of the PGR_INF.TBL, allowing effective use of the information recording medium.

Figure 20:
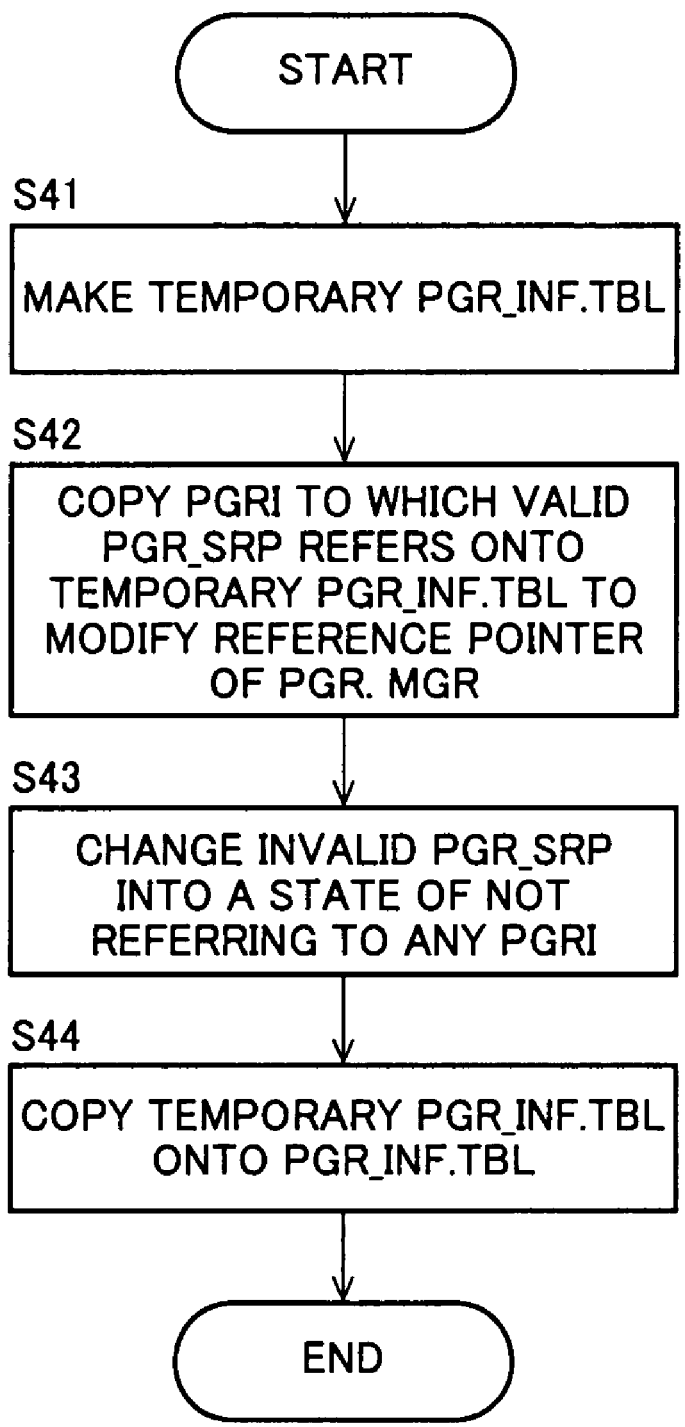
FIG. 20 is a flowchart for explaining an example of a defragmentation process executed by an information recording/reproduction device according to a fourth embodiment of the present invention.

An example of a procedure of defragmentation will be described using a flowchart shown in FIG. 20. At step S41, a temporal PGR_INF.TBL is made. Then, at step S42, the PGRI to which the valid PGR_SRP refers is copied onto the temporal PGR_INF.TBL to modify the reference pointers of the PGR. MGR. At step S43, the invalid PGR_SRP is changed into a state of making no reference to any PGRI. Specifically, the value of every bit of the invalid PGR_SRP is turned into 1. Finally, at step S44, the temporal PGR_INF.TBL is copied onto the PGR_INF.TBL. The above operation is carried out as the changing portion (not shown) in the controlling portion 24 manipulates data on the removable recording medium 30 via the external input/output I/F 21.

Figures 21, 22:
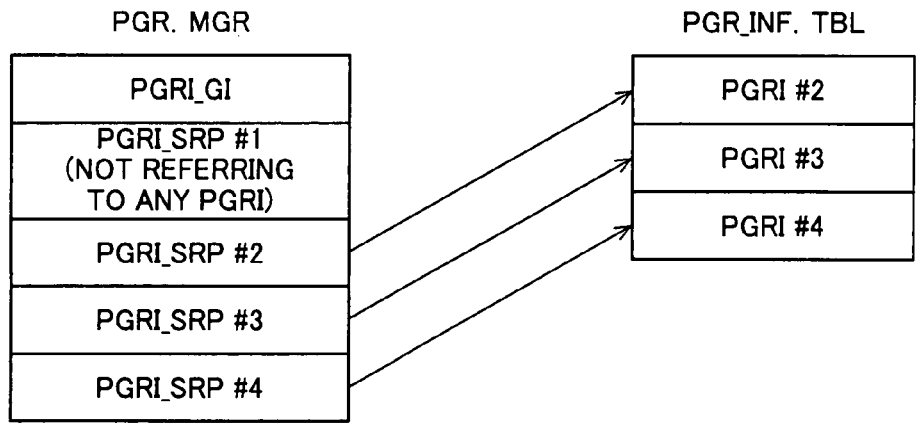
FIG. 21 is a diagram of an example of the structure of the PGRM and the PGR after execution of the defragmentation process.
FIG. 22 is a diagram of still another example of the corresponding relation between the reference pointers and the PGR to which the reference pointers refer.

FIG. 21 is a diagram of an example of the structure of the PGRM and PGR after execution of the defragmentation process. The corresponding relation between the reference pointers and the PGR to which the reference pointers refer is depicted in FIG. 22. As shown in FIG. 22, the invalid part is deleted from the PGR_INF.TBL. In the defragmentation process, the PGRI_SRP #1 may also be deleted to delete an invalid part or a part not referring to any PGRI from the PGR. MGR. In such a case, the ID of the PGR changes, so that the PGRG or UDFF referring to the PGR with the changed ID needs to change the ID of the PGR in reference to the PGR.

The above description relates to the defragmentation of the PGRI in the PGR_INF.TBL. The defragmentation of the PGRGI in the PGRG_INF.TBL and of the UDFF in the TVREC. MGR can also be carried out by the same procedure described above. Defragmentation can be carried out in any desired timing. For example, defragmentation can be carried out upon stop using the removable recording medium 30 to remove it from the information recording/reproduction device 20, or upon stop using the information recording/reproduction device 20 to shut down the device 20. Defragmentation can also be carried out when defragmentation operation is selected explicitly via the user I/F 23.

According to the present embodiment, other methods different from the above method of temporarily copying files may be adopted, which other methods include direct editing of files and execution of defragmentation following deletion of an invalid part.

Fifth Embodiment

Another embodiment will be described as a procedure of reproducing image data recorded on the information recording medium of the present invention, using the information recording/reproduction device 20 of the present invention.

Figure 23:
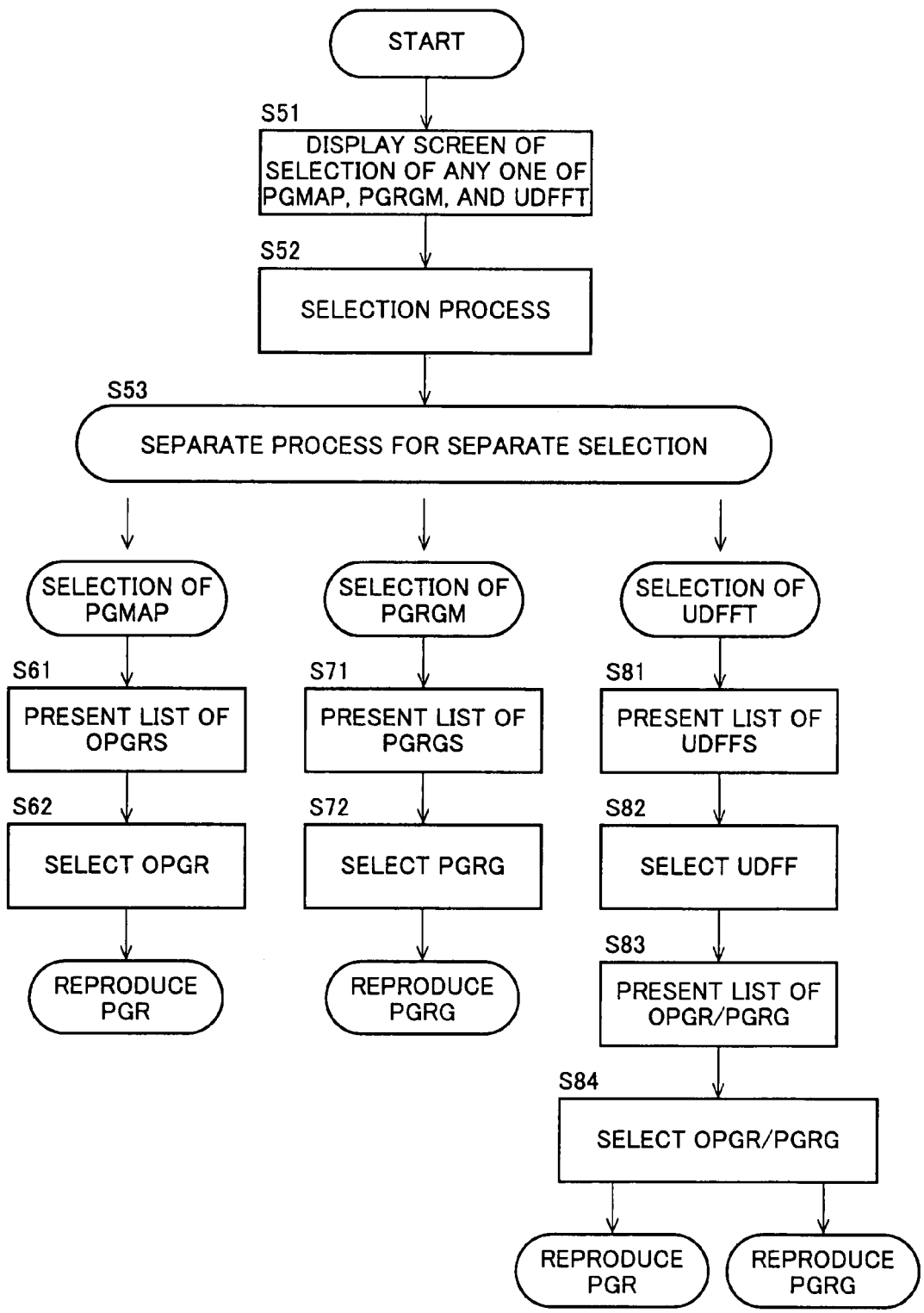
FIG. 23 is a flowchart for explaining an example of an image data selection process executed by an information recording/reproduction device according to a fifth embodiment of the present invention.

An example of a selection procedure of image data will be described referring to a flowchart shown in FIG. 23. According to the present embodiment, from which one of the PGMAP/PGRGM/UDFF image data is selected is determined first, and then image data to reproduce is selected from any determined one of the PGMAP, PGRGM, and UDFF.

The controlling portion 24 obtains image data and information related to the image data (PGMAP/PGR/PGRM/ PGRG/PGRGM/UDFFT, etc.) from the removable recording medium 30 via the external input/output I/F 21. An analyzing portion (not shown) in the controlling portion 24 analyzes the related information. Information necessary for image data selection is displayed on the display means 29 via the reproducing portion 26. A result of image data selection is input from the operation input means 28 and is sent through the user I/F 23 to the controlling portion 24.

The selection procedure will be described in detail referring to FIG. 23. At step S51, which one of the PGMAP/PGRGM/UDFFT is selected for data selection is displayed on the display means 29. At step S52, a selection result is input from the operation input means 28 and is sent through the user I/F 23 to the controlling portion 24. At step S53, a separate process for a separate selection result is started. When the PGMAP is selected, a list of OPGRs is presented at step S61. The controlling portion 24 obtains information of the PGMAP from the removable recording medium 30 via the external input/output I/F 21, and analyzes the information of the PGMAP at the analyzing portion in the controlling portion 24, which leads to display of the list of OPGRs on the display means 29 via the reproducing portion 26. Then, at step S62, when an OPGR to reproduce is selected, the selection result is input from the operation input means 28 and is sent through the user I/F 23 to the controlling portion 24.

When the PGRGM is selected at step S53, a list of PGRGs is displayed on the display means 29 via the reproducing portion 26 at step S71. Then, at step S72, when a PGRG to reproduce is selected, the selection result is input from the operation input means 28 and is sent through the user I/F 23 to the controlling portion 24.

When the UDFFT is selected at step S53, a list of UDFFs is displayed on the display means 29 via the reproducing portion 26 at step S81. Then, at step S82, a UDFF to reproduce is selected. At step S83, lists of OPGR/PGRG are presented. Subsequently at step S84, when an OPGR/PGRG to reproduce are selected, the PGR or the PGRG is reproduced. According to the present embodiment, only the valid OPGR/PGRG/UDFF are displayed when the lists of OPGR/PGRG/UDFF are displayed. In other words, only the OPGR/PGRG/UDFF that are the subject of the valid reference pointers of the PGRM/PGRGM/UDFF are displayed.

According to the present embodiment, selection is started from the PGMAP/PGRGM/UDFFT, but may be started from the lists of OPGR/PGRG/UDFF. In such a case, from which one of the OPGR/PGRG/UDFF image data is selected is determined first, and then the lists of OPGR/PGRG/UDFF may be presented to select image data or a mixed list of OPGR/PGRG/UDFF may be presented to select image data.

The PGMAP/PGRM/PGRGM/UDFFT are read out of the removable recording medium 30 every time image data is reproduced, but may be held in a buffer (not shown) built in the controlling portion 24.

A procedure of reproducing selected image data will then be described with reference to FIGS. 24 and 25.

Figure 24:
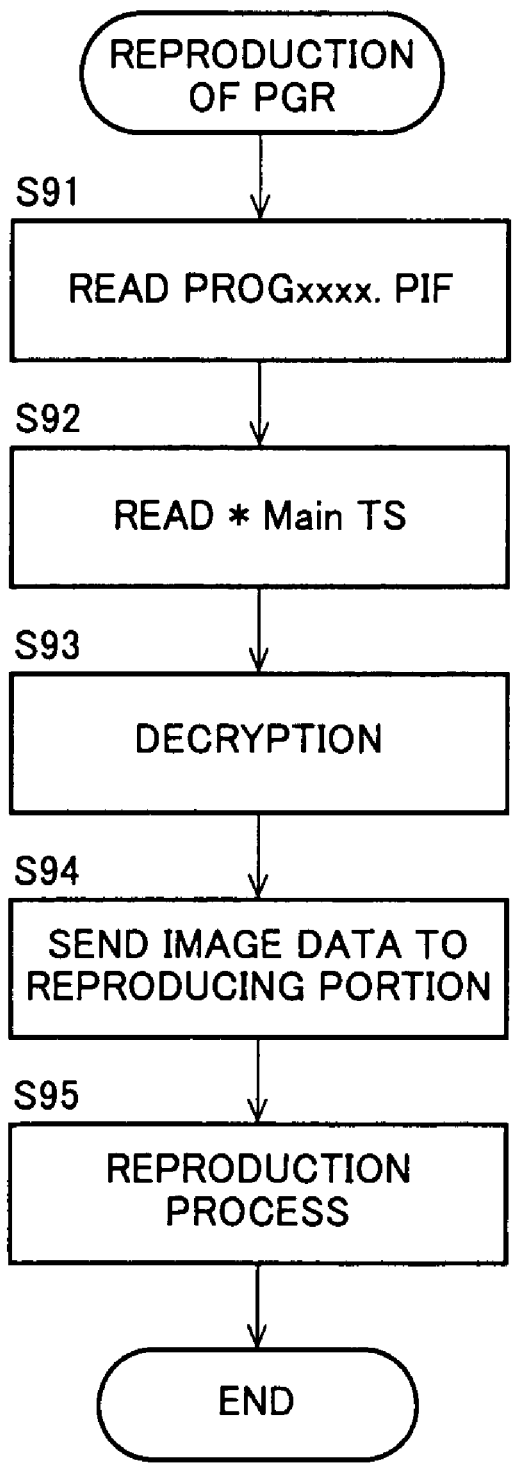
FIG. 24 is a flowchart for explaining an example of a PGR reproduction process executed by the information recording/reproduction device according to the fifth embodiment of the present invention.

FIG. 24 is a flowchart for explaining an example of a procedure of reproducing a PGR. At step S91, the controlling portion 24 reads PROGxxxx. PIF of the Program to which the corresponding PGR refers out of the removable recording medium 30 via the external input/output I/F 21. At step S92, the controlling portion 24 then reads *MainTS, which is image data, out of the removable recording medium 30 via the external input/output I/F 21. At this time, the controlling portion 24 seeks for a reading start point up to a reference start position of the PGR, and starts reading from the head of the *MainTS when the data to reproduce is an OPGR. When the data to reproduce is a UPGR, the controlling portion 24 starts reading from the part of *MainTS to which the UPGR refers.

At step S93, the encrypting portion 25 executes the decryption process on the read data and writes a decryption result in the buffer 27. At this time, information necessary for decryption is obtained from the PROGxxxx. PIF. At step S94, the data in the buffer 27 is sent to the reproducing portion 26. Then, at step S95, the reproducing portion 26 executes the decoding process on the data to output the image data to the display means 29.

Figure 25:
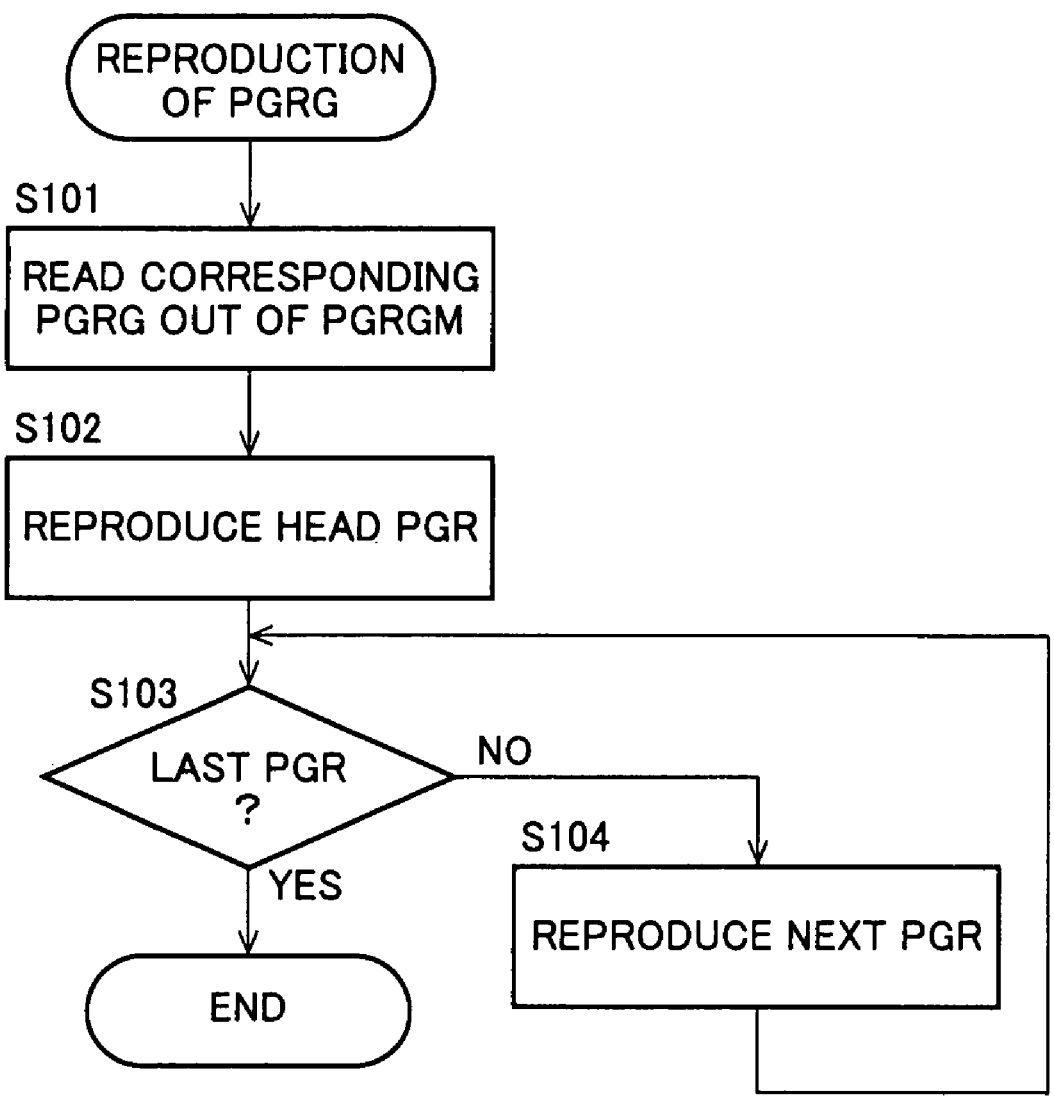
FIG. 25 is a flowchart for explaining an example of a PGRG reproduction process executed by the information recording/reproduction device according to the fifth embodiment of the present invention.

FIG. 25 is a flowchart for explaining an example of a procedure of reproducing a PGRG. At step S101, the controlling portion 24 reads information of the PGRG from the PGRGM on the removable recording medium 30 via the external input/output I/F 21. Then, at step S102, the controlling portion 24 reproduces the head PGR. The procedure of reproducing the PGR has been described above referring to FIG. 24. Following the completion of the reproduction of the PGR, at step S103, the controlling portion 24 determines on whether the reproduced PGR is the last PGR of the PGRG. When the reproduced PGR is the last PGR (YES at step S103), the procedure comes to an end at that point. When the PGR is not the last PGR (NO at step S103), the next PGR is reproduced at step S104. Following the completion of the reproduction of the next PGR, the procedure returns to step S103.

Through the above procedures, selected image data can be reproduced. According to the present embodiment, the information recording/reproduction device 20 does not provide a means for selecting a UPGR, but can be configured to provide the selected UPGR. In that case, a procedure of reproducing the UPGR is the same procedure as described for the reproduction of the PGRG.

The description of the present embodiment is made on a case of reproducing image data from the head data. The present embodiment, however, enables fast-forwarding/fast-reversing/slow reproduction/reverse slow reproduction/change of a reproduction position to the head PGR or any desired position, etc. A procedure to execute in such cases is the same as a procedure executed in a hard disc recorder or a DVD recorder.

The detail of the data structures used in the embodiments of the present invention will then be described with reference to FIGS. 26 to 44. Each of the data structures is described here as an example, and the data structure is not limited to that of the described example. In the data structures, uimsbf represents an integer without the sign (the first 1 byte is the highest order byte), bslbf represents a bit string (the left side is the highest order bit), and DString[n] represents a data format capable of storing a character string consisting of n bytes, having a data size of n+8 bytes in total that includes a data segment of character type, reservation area, etc., in addition to a data body.

Figures 26, 27:
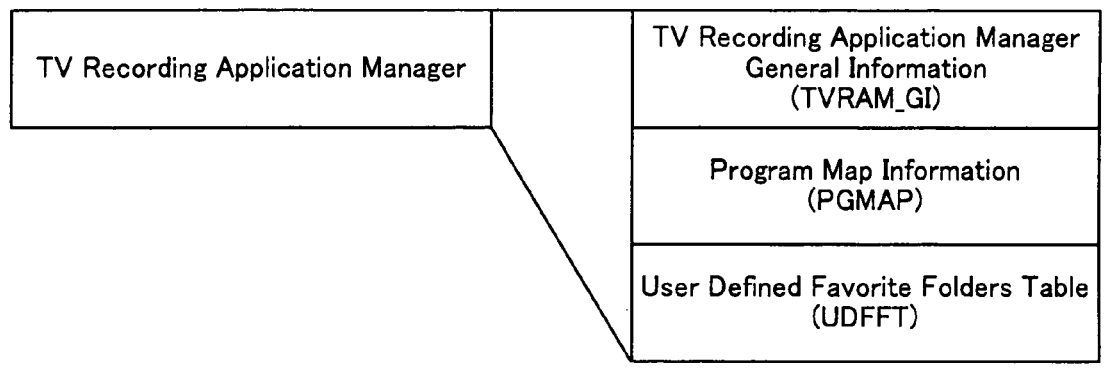
FIG. 26 is a diagram of an example of the data structure of TV Recording Application Manager.
FIG. 27 is a diagram of an example of the data structure of TVRAM_GI.

FIG. 26 is a diagram of an example of the data structure of TV Recording Application Manager. In this example, the TV Recording Application Manager is basically composed of TV Recording Application Manager General Information (TVRAM_GI), the PGMAP, and the UDFFT.

As shown in FIG. 27, the TV Recording Application Manager General Information (TVRAM_GI) is composed of TVRA_VER and TVRA_RM. In FIG. 27, BP is an abbreviation for Byte Position, representing the absolute byte number from the data head. Length in Bytes represents the length of stored information, Field Name represents recorded contents, and Contents is an abbreviation for the recorded contents.

The TV Recording Application Version (TVRA_VER) represents the version of the data structure. The TV Recording Application Resume Mark (TVRA_RM) is composed of information indicating a resume position.

Figures 28, 29:
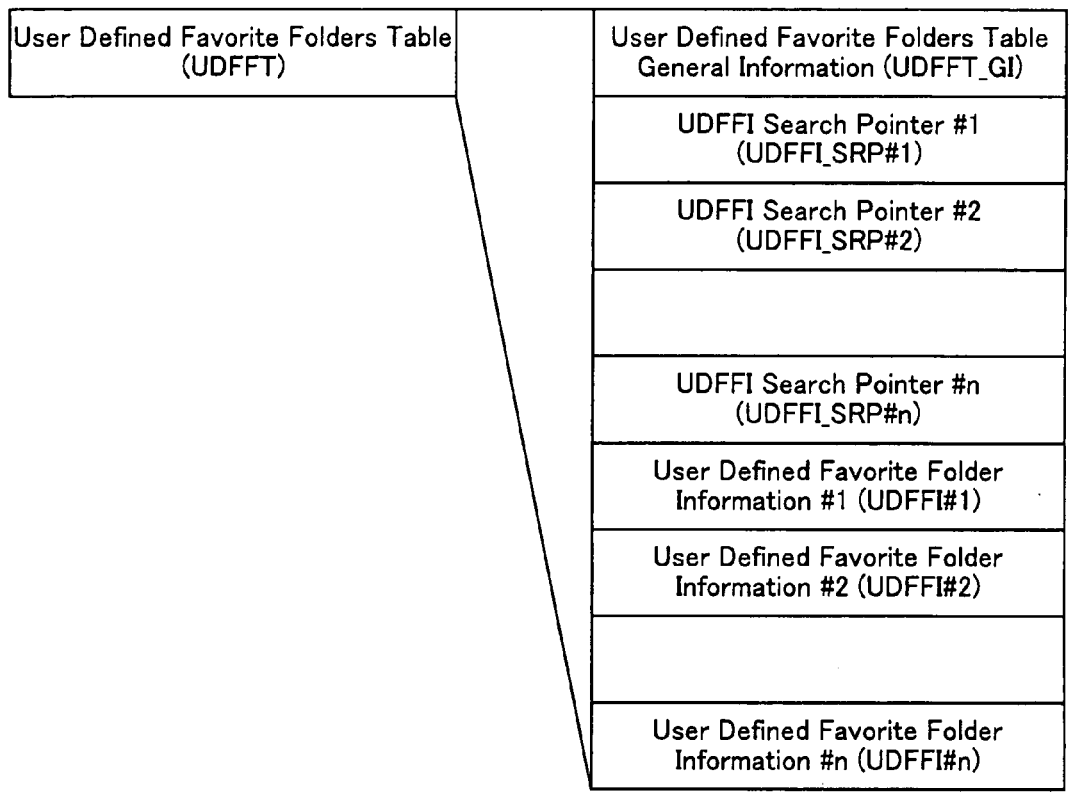
FIG. 28 is a diagram of an example of the data structure of UDFFT.
FIG. 29 is a diagram of an example of the data structure of UDFFT_GI.

FIG. 28 is a diagram of an example of the data structure of the UDFFT, which is composed of UDFFT_GI, one or more UDFFI_SRPs, and one or more UDFFIs. One UDFFI_SRP points out one UDFFI.

FIG. 29 is a diagram of an example of the data structure of the UDFFT_GI, in which Number of User Defined Favorite Folders (UDFF_N) represents the number of UDFFI_SRPs.

Figure 30:
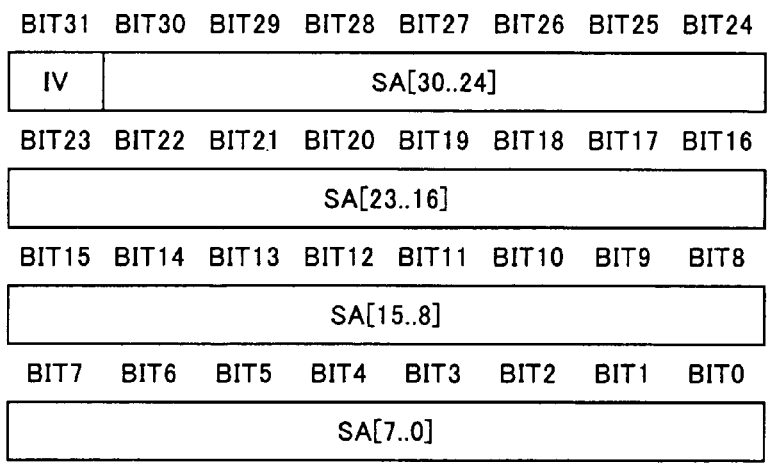
FIG. 30 is a diagram of an example of the data structure of UDFFI_SRP.

FIG. 30 is a diagram of an example of the data structure of the UDFFI_SRP. The User Defined Favorite Folder Information Search Pointer (UDFFI_SRP) is the pointer that points out UDFFI_I in the UDFFT. In the UDFFI_SRP, the highest order bit IV indicates whether the pointer is valid or invalid, and lower order 31 bits (SA) constitute a pointer pointing out the position of UDFFI_I. If this pointer consists of a bit string of 7FFFFFFFh, the pointer does not point out anywhere, which means an exceptional state.

Figure 31:
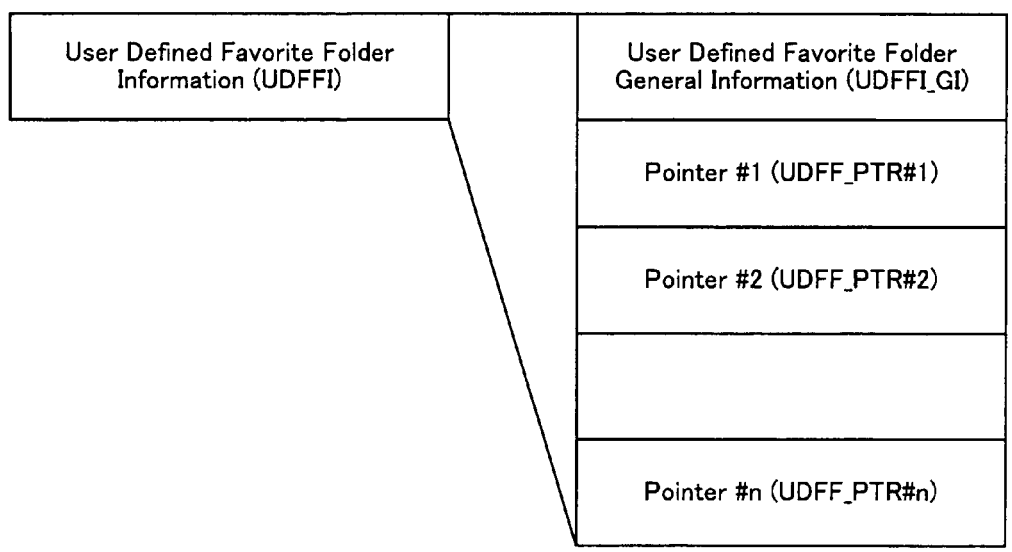
FIG. 31 is a diagram of an example of the data structure of UDFFI.

FIG. 31 is a diagram of an example of the data structure of a UDFFI. The User Defined Favorite Folder Information (UDFFI) is composed of User Defined Favorite Folder Information General Information (UDFFI_GI), and one or more UDFF_PTRs that are pointers pointing out PGRGs or PGRs.

FIG. 32 is a diagram of an example of the data structure of the UDFFI_GI. The User Defined Favorite Folder Information General Information (UDFFI_GI) is composed of such information as Length of User Defined Favorite Folder Information, User Defined Favorite Folder Name, User Defined Favorite Folder Thumbnail, and Number of Pointers.

The Length of User Defined Favorite Folder Information (UDFFI_LEN) represents the number of bytes composing the UDFFI.

The User Defined Favorite Folder Name (UDFF_NAME) represents the name of the UDFF. At this point, the data structure DString[n] has such a structure as shown in FIG. 33, in which "Character Set" represents the type of a character code. The value and meaning of "Character Set" is, for example, defined as follows.

10h: ISO/IEC 646 IRV (ASCII)
80h: Reserved for Japanese Digital TV
81h: Japanese Character Set defined in JIS X0208 (Shift JIS)
82h: Reserved for Japanese Digital TV
Others: Reserved Other items in the DString[n] include "Reserved", which represents a reserved area for data extension, "Character strings field size", which represents the size of a storage area for a character string, "Length of character string", which represents the size of a storage area for a character string actually on use, and "Character Strings", which represents the substance of a character string.

In FIG. 32, the User Defined Favorite Folder Thumbnail (UDFF_TN) specifies a thumbnail of the UDFF. The Number of Pointers (PTR_N) means the number of PGRGs and PGRs contained in the UDFF.

FIG. 34 is a diagram of an example of the data structure of the reference pointer (PTR). The Pointer (PTR) points out the PGRG or PGR to which the UDFF refers. The Pointer points out the PGRG when the highest order bit ET is 1, and points out the PGR when the ET is 0. The Pointer's lower order 15 bits represents an ID.

Figures 35, 36:
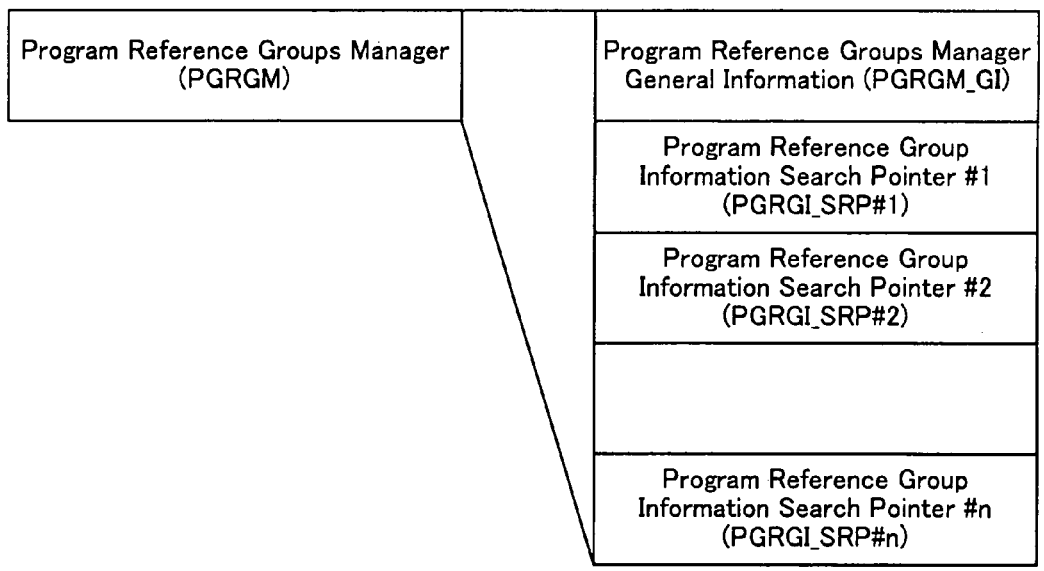
FIG. 35 is a diagram of an example of the data structure of PGRGM.
FIG. 36 is a diagram of an example of the data structure of PGRGM_GI.

FIG. 35 is a diagram of an example of the data structure of the PGRGM. The Program Reference Groups Manager (PGRGM) is composed of Program Reference Groups Manager General. Information (PGRGM_GI), and one or more Program Reference Group Information Search Pointers (PGRGI_SRP). The IDs of PGRGs are given according to the order of the PGRGI_SRPs, and the head ID is 1. According to the present embodiment, the PGRGM is capable of storing 999 PGRGI_SRPs, so that the maximum ID is 999. The maximum of the ID and PGRGI_SRPs is not limited to 999, but may be determined to be any desired number.

FIG. 36 is a diagram of an example of the data structure of the PGRGM_GI. The Program Reference Groups Manager General Information (PGRGM_GI) is composed of the following elements.

Reserved: Reserved area for data extension.
Number of Program Reference Groups (PGRG_N): the number of PGRG_SRPs.

Figure 37:
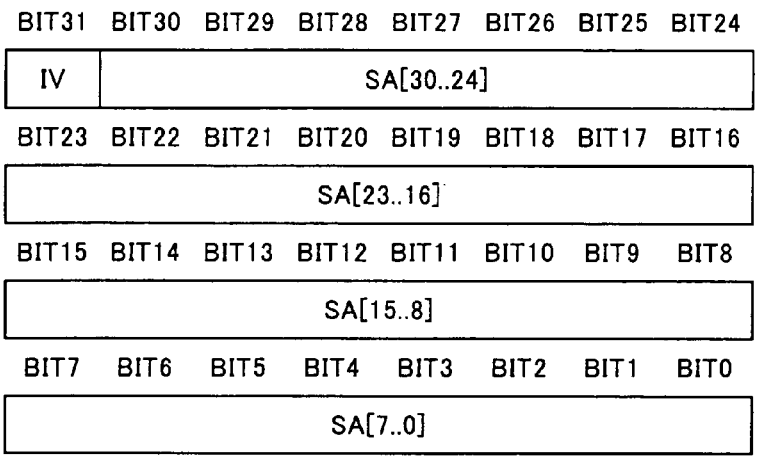
FIG. 37 is a diagram of an example of the data structure of PGRGI_SRP.

FIG. 37 is a diagram of an example of the data structure of the PGRGI_SRP. The Program Reference Group Information Search Pointer (PGRGI_SRP) is the pointer that points out PGRGI in the PGRGM. In the PGRGI_SRP, the highest order bit IV indicates whether the pointer is valid or invalid, and lower order 31 bits (SA) constitute a pointer pointing out the position of the PGRGI. If this pointer consists of a bit string of 7FFFFFFFh, the pointer does not point out anywhere, which means an exceptional state.

Figure 38:
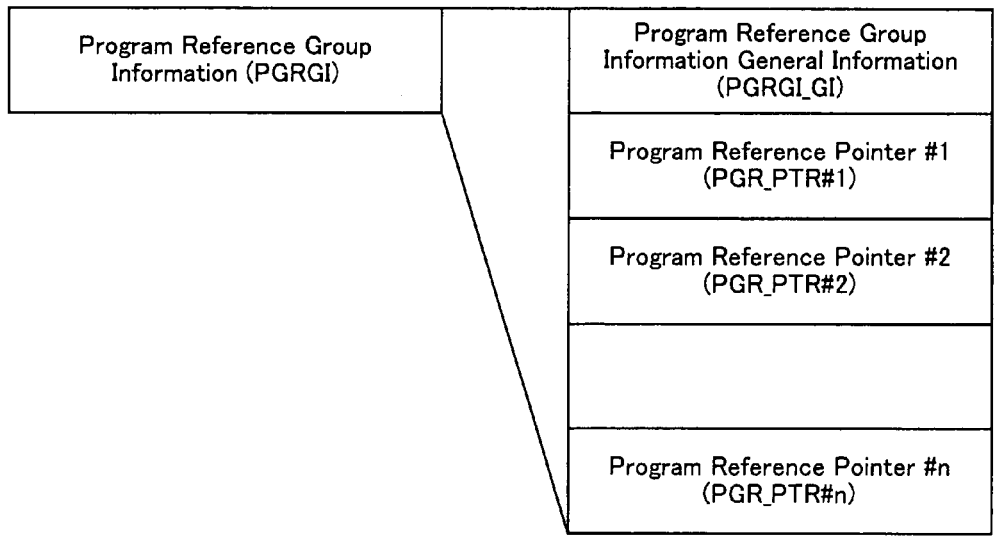
FIG. 38 is a diagram of an example of the data structure of PGRGI.

FIG. 38 is a diagram of an example of the data structure of the PGRGI. The Program Reference Group Information (PGRGI) is composed of Program Reference Group Information General Information (PGRGI_GI), and one or more Program Reference Pointers (PGR_PTR) making reference. The ID of the PGRGI is determined according to what place the PGRGI_SRP referring to the PGRGI is in from the top PGRGI_SRP. The above PGMAP is of the same structure as the PGRGI of FIG. 38.

Figures 39, 40, 41:
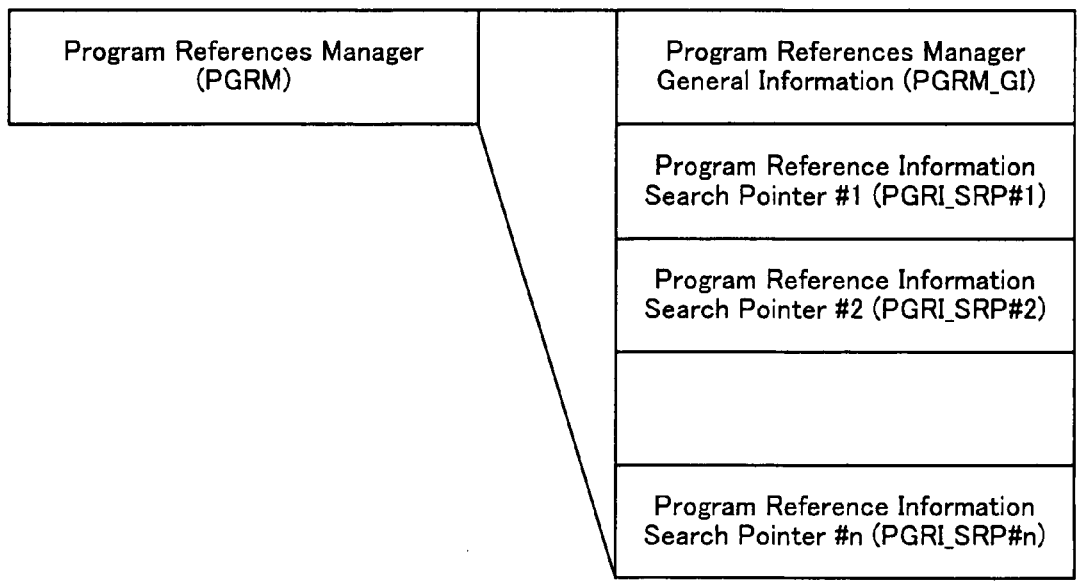
FIG. 39 is a diagram of an example of the data structure of PGRGI_GI.
FIG. 40 is a diagram of an example of the data structure of PGR_PTR.
FIG. 41 is a diagram of an example of the data structure of PGRM.

FIG. 39 is a diagram of an example of the data structure of the PGRGI_GI. The PGRGI_GI is composed of such information as Length of Program Reference Group Information, Program Reference Group Name, Program Reference Group Thumbnail, and Number of Program Reference Pointers.

The Length of Program Reference Group Information (PGRGI_LEN) represents the length of the PGRGI. The Program Reference Group Name (PGRG_NAME) represents the name of the PGRG. The Program Reference Group Thumbnail (PGRG_TN) represents a thumbnail of the PGRG. The Number of Program Reference Pointers (PGR_PTR_N) represents the number of PGR_PTRs.

FIG. 40 is a diagram of an example of the data structure of the PGR_PTR, which is composed of the ID of the PGR to which the PGR_PTR refers.

FIG. 41 is a diagram of an example of the data structure of the PGRM. The Program References Manager (PGRM) is composed of Program References Manager General Information (PGRM_GI), and one or more Program Reference Information Search Pointers (PGRI_SRP) making reference. The IDs of PGRs are given according to the order of the PGRI_SRPs, and the head ID is 1. According to the present embodiment, the PGRM is capable of storing 9999 PGRI_SRPs, so that the maximum ID is 9999. The maximum ID and PGRI_SRPs is not limited to 9999, but may be determined to be any desired number.

FIG. 42 is a diagram of an example of the data structure of the PGRM_GI. The Program References Manager General Information (PGRM_GI) is composed of the following elements.

Reserved: Reserved area for data extension.
Number of Program References (PGR_N): the number of PGRI_SRPs.

FIG. 43 is a diagram of an example of the data structure of the PGRI_SRP. The Program Reference Information Search Pointer (PGRI_SRP) is the pointer that points out PGRI in the PGRM. In the PGRI_SRP, the highest order bit IV indicates whether the pointer is valid or invalid, and lower order 31 bits (SA) constitute a pointer pointing out the position of the PGRI. If this pointer consists of a bit string of 7FFFFFFFh, the pointer does not point out anywhere, which means an exceptional state.

The Program Reference Information (PGRI) is composed of Program Reference Information General Information (PGRI_GI), and one or more Indexes (IDX) making reference. The ID of the PGRI is determined according to what place the PGRI_SRP referring to the PGRI is in from the top PGRI_SRP.

The Program Reference Information General Information (PGRI_GI) is composed of PGR Type, Reserved, Length of Program Reference Information, Program Reference Name, Recorded Program Location, Start Position, End Position, Program Reference Thumbnail, and Number of Indexes.

The Program Reference Type (PGR_TYPE) indicates the OPGR when taking the value of 1, and indicates the UPGR when taking the value of 2. The Length of Program Reference Information (PGRI_LEN) represents the length of the PGRI. The Program Reference Name (PGR_NAME) represents the name of the PGR. The Recorded Program Location (PG_LOC) is a file name indicating image data making reference. The Start Position (PG_START) represents the start point of the PGR, while the End Position (PG_END) represents the end point of the PGR. The Program Reference Thumbnail (PGR_TN) represents a thumbnail of the PGR. The Number of Indexes (IDX_N) is the number of IDXs contained in the PGR.

The invention claimed is:

1. An information recording/reproduction device having a recording portion recording image data, comprising:
    a portion for generating first class information and second class information, the first class information including reference information indicating at least a part of the image data and the second class information including reference information indicating the first class information;
    a class information recording portion for recording the first class information and the second class information; and
    a portion for obtaining reference information on the first class information from the second class information, wherein
    the second class information includes validity information indicating validity/invalidity of the first class information and position information indicating a recording position of the first class information as being the reference information on the first class information, and
    the class information recording portion defrags the first class information based on the validity information and position information on the first class information being obtained from the second class information by making a temporary list file, processing reference information such that valid reference information is copied onto the temporary list file and invalid reference information makes no reference to any file, and replacing an original list file with the temporary list file.

2. The information recording/reproduction device as defined in claim 1, comprising a portion that reproduces corresponding image data based on the validity information and position information on the first class information obtained from the second class information.

3. The information recording/reproduction device as defined in claim 1, wherein the device changes the validity information on the first class information obtained from the second class information into invalid information to invalidate the first class information.

4. The information recording/reproduction device as defined in claim 1, wherein the device changes the position information on the first class information obtained from the second class information into an invalid value to stop indicating the first class information.

5. The information recording/reproduction device as defined in claim 1, wherein in a case in which the validity information on the first class information obtained from the second class information is changed into invalid information, or in a case in which the position information on the first class information obtained from the second class information is changed into an invalid value, new first class information is generated based on the first class information.

6. A non-transitory computer-readable recording medium having image data recorded thereon,
    the recording medium recording thereon first class information and second class information, the first class information including reference information indicating at least a part of the image data and the second class information including reference information indicating the first class information, wherein
    the second class information includes validity information indicating validity/invalidity of the first class information, and position information indicating a recording position of the first class information as being the reference information on the first class information, and
    the first class information is able to be defragged based on the validity information and position information on the first class information obtained from the second class information by making a temporary list file, processing reference information such that valid reference information is copied onto the temporary list file and invalid reference information makes no reference to any file, and replacing an original list file with the temporary list file.

7. A non-transitory computer-readable recording medium having a Program composed of image data recorded thereon, the recording medium recording thereon:
    a Program Reference (PGR) including reference information indicating at least a part of the Program;
    a Program Reference Group (PGRG) including reference information indicating the PGR;
    a Program Reference Manager (PGRM) collectively recording the PGR and reference information on the PGR; and
    a Program Reference Group Manager (PGRGM) collectively recording the PGRG and reference information on the PGRG, wherein
    the PGRM or the PGRGM includes validity information indicating validity/invalidity of the PGR or the PGRG, the position information indicating a recording position of the PGR or the PGRG as being reference information on the PGR or the PGRG, and
    the recording medium enables the PGR or the PGRG to be defragged based on the validity information and position information on the PGR or the PGRG obtained from the PGRM or the PGRGM by making a temporary list file, processing reference information such that valid reference information is copied onto the temporary list file and invalid reference information makes no reference to any file, and replacing an original list file with the temporary list file.

8. The non-transitory computer-readable recording medium as defined in claim 7, the recording medium recording thereon:
    a User Defined Favorite Folder (UDFF) including reference information indicating the PGR or to the PGRG; and
    a User Defined Favorite Folders Table (UDFFT) collectively recording the UDFF and reference information on the UDFF, wherein
    the UDFFT includes validity information indicating validity/invalidity of the PGR or the PGRG, and position information indicating a recording position of the PGR or the PGRG, the validity information and position information being reference information on the PGR or the PGRG, and
    the recording medium enables the PGR or the PGRG to be defragged based on the validity information and position information of the PGR or the PGRG obtained from the UDFFT.

9. The non-transitory computer-readable recording medium as defined in claim 8, wherein the medium allows recording a state of not indicating both of the PGR and the PGRG as the reference information indicating the PGR or the PGRG.

* * * * *